US011317348B2

(12) United States Patent
Chitrakar et al.

(10) Patent No.: US 11,317,348 B2
(45) Date of Patent: Apr. 26, 2022

(54) COMMUNICATION APPARATUS AND COMMUNICATION METHOD FOR LOW POWER EVENT MONITORING

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/972,968

(22) PCT Filed: Jun. 20, 2019

(86) PCT No.: PCT/SG2019/050306
§ 371 (c)(1),
(2) Date: Dec. 7, 2020

(87) PCT Pub. No.: WO2019/245456
PCT Pub. Date: Dec. 26, 2019

(65) Prior Publication Data
US 2021/0258877 A1   Aug. 19, 2021

(30) Foreign Application Priority Data
Jun. 22, 2018 (SG) ............................ 10201805402Y

(51) Int. Cl.
*H04W 52/02* (2009.01)
*H04L 5/00* (2006.01)
*H04W 12/121* (2021.01)

(52) U.S. Cl.
CPC ....... *H04W 52/0229* (2013.01); *H04L 5/0007* (2013.01); *H04W 12/121* (2021.01); *H04W 52/0216* (2013.01); *H04W 52/0274* (2013.01)

(58) Field of Classification Search
USPC ........................................................ 370/329
See application file for complete search history.

(56) References Cited

FOREIGN PATENT DOCUMENTS

CN       108076476 A       5/2018

OTHER PUBLICATIONS

IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™—2016, IEEE Computer Society, 3534 pages.

(Continued)

*Primary Examiner* — Angel T Brockman
(74) *Attorney, Agent, or Firm* — Seed IP Law Group LLP

(57) ABSTRACT

According to an aspect of the present invention, a communication apparatus is provided. The communication apparatus may include: a Wake Up Receiver (WURx) which, in operation, receives Wake-Up Radio (WUR) Physical Layer Protocol Data Units (PPDU) from an Access Point (AP); determination circuitry which, in operation, determines an unexpected event related to the reception of the WUR PPDU; and a Primary Connectivity Radio (PCR) transmitter which, in operation, transmits to an access point (AP) information based on the determined unexpected event.

16 Claims, 39 Drawing Sheets

500

| S.No. | Event Type | Associated Counter/Flag | Description | Cause of Event |
|---|---|---|---|---|
| 1 | CRC Error | dot11WURCRCErrorCount | Number of WUR PPDUs received with failed CRC | Transmission error or wrong embedded BSSID |
| 2 | False Wake-up | dot11WURFalseWakeupCount | Number of Wake-up frames that caused the STA to falsely wake its PCR | Address collision or intentional replay attack |
| 3 | False WUR Beacon | dot11WURFalseBeaconsCount | Number of WUR Beacons with P-TSF value outside expected range | Large TSF drift or intentional fake WUR Beacon attack |
| 4 | OBSS WUR Detected | dot11WUROBSSDetectedFlag | Flag to record reception of OBSS WUR Beacon | Wrong Transmit ID in received WUR Beacons |
| 5 | Missed WUR Beacons | dot11WURLostBeaconsCount | Number of missed WUR Beacons | Failure to receive WUR Beacons at TWBTTs |
| 6 | MIC Error | dot11WURMICErrorCount | Number of protected WUR frames with failed MIC | Authentication error or wrong embedded BSSID |
| 7 | Replay Attack | dot11WURReplayAttackCount | Number of protected WUR frames with IPN less than Replay Counter (RC) | IPN out of sync or intentional replay attack |

(56) References Cited

OTHER PUBLICATIONS

International Search Report, dated Aug. 6, 2019, for corresponding International Application No. PCT/SG2019/050306, 3 pages.
Po-Kai Huang, "Specification Framework for TGba," IEEE 802.11-17/0575r11 (IEEE 802.11-15/0132r1511), Mar. 26, 2018, 18 pages.

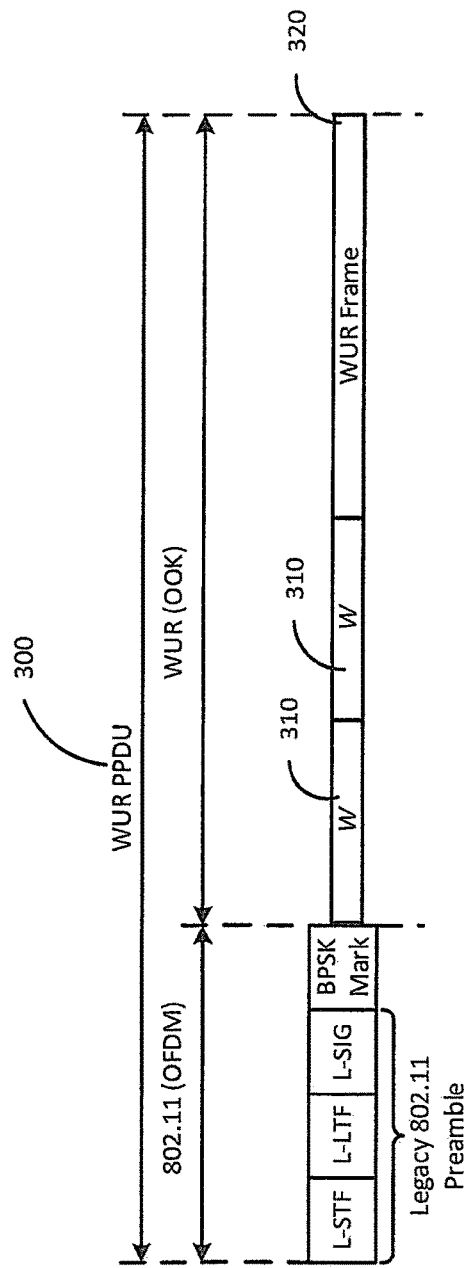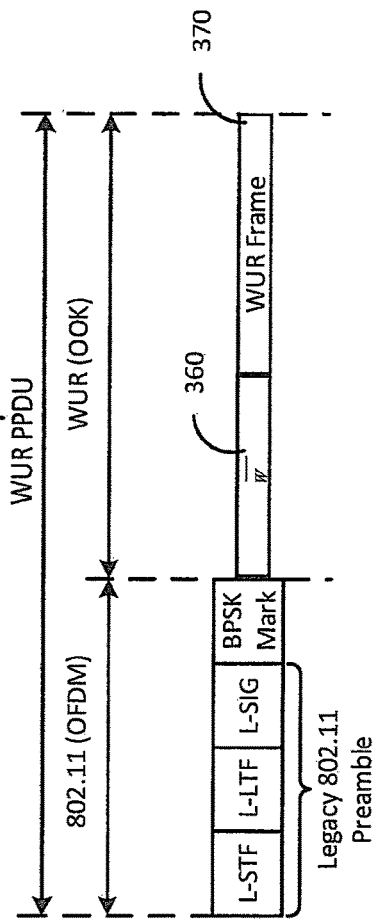
FIG. 3A
FIG. 3B

| S.No. | Event Type | Associated Counter/Flag | Description | Cause of Event |
|---|---|---|---|---|
| 1 | CRC Error | dot11WURCRCErrorCount | Number of WUR PPDUs received with failed CRC | Transmission error or wrong embedded BSSID |
| 2 | False Wake-up | dot11WURFalseWakeup-Count | Number of Wake-up frames that caused the STA to falsely wake its PCR | Address collision or intentional replay attack |
| 3 | False WUR Beacon | dot11WURFalseBeacons-Count | Number of WUR Beacons with P-TSF value outside expected range | Large TSF drift or intentional fake WUR Beacon attack |
| 4 | OBSS WUR Detected | dot11WUROBSSDetected-Flag | Flag to record reception of OBSS WUR Beacon | Wrong Transmit ID in received WUR Beacons |
| 5 | Missed WUR Beacons | dot11WURLostBeaconsCount | Number of missed WUR Beacons | Failure to receive WUR Beacons at TWBTTs |
| 6 | MIC Error | dot11WURMICErrorCount | Number of protected WUR frames with failed MIC | Authentication error or wrong embedded BSSID |
| 7 | Replay Attack | dot11WURReplayAttack Count | Number of protected WUR frames with IPN less than Replay Counter (RC) | IPN out of sync or intentional replay attack |

FIG. 5

| WUR Event Request Subelement | ID |
|---|---|
| CRC Error | 0 |
| False Wake-up | 1 |
| False WUR Beacon | 2 |
| OBSS WUR Detected | 3 |
| Missed WUR Beacons | 4 |
| MIC Error* | 5 |
| Replay Attack* | 6 |
| Reserverd | 7 ~ 255 |
| *Note: Only applicable for WUR STAs capable of receiving Protected WUR frames | |

CRC Error Subelement

| Subelement ID | Length | dot11WUR CRCError Threshold |
|---|---|---|

Octets: 1 | 1 | 2

False WUR Beacons Subelement

| Subelement ID | Length | dot11WUR FalseBeacons Threshold |
|---|---|---|

Octets: 1 | 1 | 1

OBSS WUR Detected Subelement

| Subelement ID | Length | dot11WUR OBSSDetected Threshold |
|---|---|---|

Octets: 1 | 1 | 1

MIC Error Subelement

| Subelement ID | Length | dot11WUR MICError Threshold |
|---|---|---|

Octets: 1 | 1 | 1

False Wake-up Subelement

| Subelement ID | Length | dot11WUR False Wake-up Threshold |
|---|---|---|

Octets: 1 | 1 | 1

Lost WUR Beacons Subelement

| Subelement ID | Length | dot11WUR LostBeacons Threshold |
|---|---|---|

Octets: 1 | 1 | 1

Replay Attack Subelement

| Subelement ID | Length | dot11WUR ReplayAttack Threshold |
|---|---|---|

Octets: 1 | 1 | 1

| WUR Event Type | Event Description | Event Counter |
|---|---|---|
| 0 | CRC Error | dot11WURCRCErrorCount |
| 1 | False Wake-up | dot11WURFalseWakeup-Count |
| 2 | False WUR Beacon | dot11WURFalseBeaconsCount |
| 3 | OBSS WUR Detected | dot111WUROBSSDetectedFlag |
| 4 | Missed WUR Beacons | dot11WURLostBeaconsCount |
| 5 | MIC Error | dot11WURMICErrorCount |
| 6 | Replay Attack | dot11WURReplayAttack Count |

FIG. 8C

| WUR Event Type | Corresponding remedial action by WUR AP |
|---|---|
| 0 (CRC Error) | Switch to Low Data Rate for WUR transmissions to the WUR STA or Assign different WUR Channel |
| 1 (False Wake-up) | Enable security for WUR wake-up frames to the WUR STA* |
| 2 (False WUR Beacons) | Enable security for WUR Beacons* |
| 3 (OBSS WUR Detected) | Assign different WUR Channel |
| 4 (Lost WUR Beacons) | Assign different WUR Channel |
| 5 (MIC Error)* | Assign new integrity Key to the WUR STA |
| 6 (Replay Attack)* | Assign new integrity Key to the WUR STA |
| *Note: Only applicable for WUR STAs capable of receiving Protected WUR frames | |

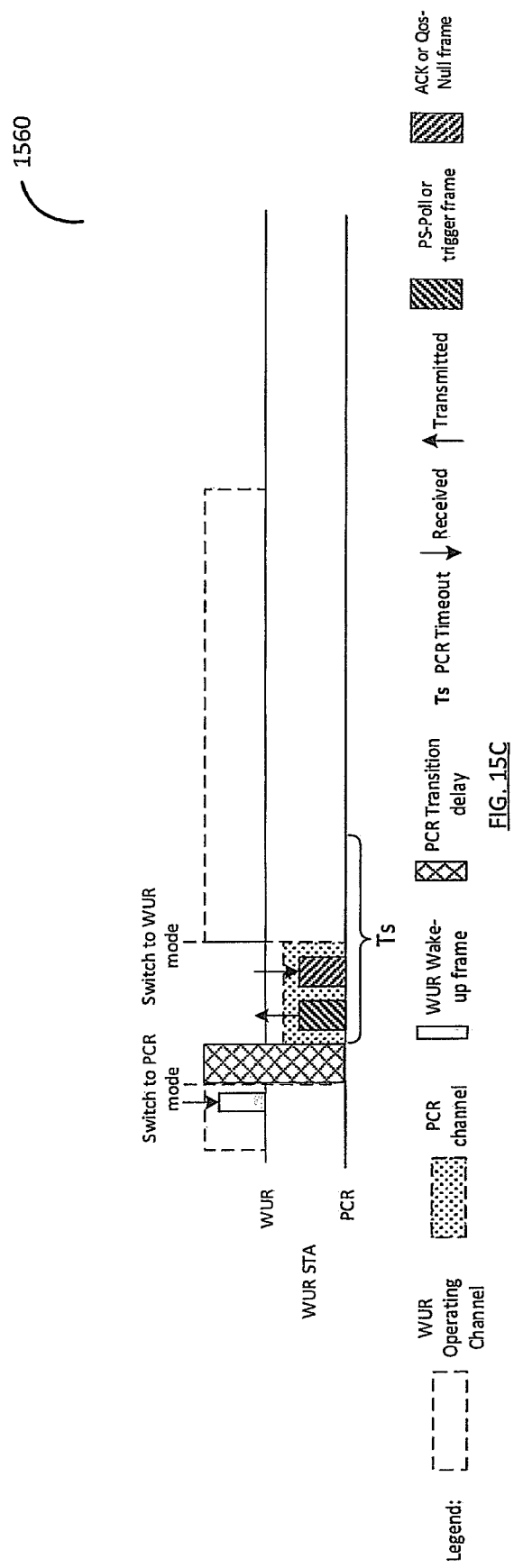

| Order | Information |
|---|---|
| 1 | Category |
| 2 | WUR Action |
| 3 | Dialog Token |
| 4 | WUR Events Element |

FIG. 18A

| Value | Meaning |
|---|---|
| 0 | WUR Mode Setup |
| 1 | WUR Mode Teardown |
| 2 | WUR Events |
| 3 - 255 | Reserved |

| Statistic Group Name | Group Identity |
|---|---|
| STA Counters from dot11CountersTable | 0 |
| ... | : |
| RSNA Counters | 16 |
| WUR Counters | 17 |
| Reserved | 18 - 255 |

| Measurement Count | Trigger Timeout | STA Counter Trigger Condition | dot11WUR CRCError Threshold (Optional) | dot11WUR FalseWake-up Threshold (Optional) | dot11WUR False Beacons Threshold (Optional) | dot11WUR LostBeacons Threshold (Optional) | dot11WUR OBSSDetected Threshold (Optional) | dot11WUR MICError Threshold (Optional) | dot11WUR ReplayAttack Threshold (Optional) |
|---|---|---|---|---|---|---|---|---|---|
| 4 | 2 | 2 | 0 or 2 | 0 or 2 | 0 or 2 | 0 or 2 | 0 or 2 | 0 or 2 | 0 or 2 |

Octets:

| Counter Presence Bitmap | dot11WUR CRCError Count | dot11WUR FalseWakeup Count | dot11WUR FalseBeacons Count | dot11WUR LostBeacons Count | dot11WUR OBSSDetected Count | dot11WUR MIC Error Count | dot11WUR ReplayAttack Count |
|---|---|---|---|---|---|---|---|
| 1 | 0 or 2 | 0 or 2 | 0 or 2 | 0 or 2 | 0 or 2 | 0 or 2 | 0 or 2 |

Octets:

FIG. 19C

| WUR Event Type | Event Description | Corresponding Request |
|---|---|---|
| 0 | CRC Error | Request to use Low Data Rate |
| 1 | False Wake-up | Request to enable protection for WUR wake-up frames |
| 2 | False WUR Beacon | Request to enable protection for WUR Beacons |
| 3 | OBSS WUR Detected | Request different WUR Channel |
| 4 | Missed WUR Beacons | Request different WUR Channel or, |
| 5 | MIC Error | Transmit Probe request frame / Wait for PCR Beacons |
| 6 | Replay Attack | Request New integrity Key |

FIG. 20A

| Subfield | Definition |
|---|---|
| On Duration | ... |
| Duty Cycle Period | ... |
| WUR Requests | Indicates parameters/changes requested by WUR STA |

FIG. 20B

| Low Data Rate | Wake-up Protection | Beacon Protection | Change WUR Channel | Change Pairwise integrity Key | Change Group integrity Key | Reserved |
|---|---|---|---|---|---|---|
| 1 | 1 | 1 | 1 | 1 | 1 | 2 |

Bits:

FIG. 20C

| Subfield | Definition |
|---|---|
| WUR ID | ... |
| Starting time of the WUR duty cycle | ... |
| WUR Channel Offset | ... |
| Global ID List | ... |
| Protection | Indicates parameter related to Protected WUR frames |

Protection 2050

| Wake-up Protection enabled | Beacon Protection enabled | Reserved |
|---|---|---|
| 1 | 1 | 6 |

2052  2054

Bits:

| Element ID | Length | Element ID Extension | Minimum Wake-up Duration | Duty Cycle Period Units | WUR Operation Class | WUR Channel | WUR Beacon Period | Offset of TWBTT | WUR Parameters | WUR Thresholds |
|---|---|---|---|---|---|---|---|---|---|---|
| 1 | 1 | 1 | 1 | 2 | 1 | 1 | 2 | 2 | 1 | variable |

Octets 2100, 2110, 2120

FIG. 21B

| Counter | Protection Required | Reserved |
|---|---|---|
| 4 | 1 | 3 |

Bits 2112, 2110

FIG. 21C

| Threshold Presence Bitmap | dot11WUR CRCError Threshold | dot11WUR False Wake-up Threshold | dot11WUR FalseBeacons Threshold | dot11WUR LostBeacons Threshold | dot11WUR OBSSDetected Threshold | dot11WUR MICError Threshold | dot11WUR ReplayAttack Threshold |
|---|---|---|---|---|---|---|---|
| 1 | 0 or 2 | 0 or 2 | 0 or 2 | 0 or 2 | 0 or 2 | 0 or 2 | 0 or 2 |

Octets

2120

WUR Mode Teardown frame Action field format — 2430

| Order | Information |
|---|---|
| 1 | Category |
| 2 | WUR Action |
| 3 | Reason |

2432

FIG. 24B ately related to a communication apparatus and a communication method, for example to a communication apparatus and a communication method for low power event reporting.

COMMUNICATION APPARATUS AND COMMUNICATION METHOD FOR LOW POWER EVENT MONITORING

TECHNICAL FIELD

The present disclosure is generally related to a communication apparatus and a communication method, for example to a communication apparatus and a communication method for low power event reporting.

BACKGROUND ART

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and coexists with legacy IEEE 802.11 devices in the same frequency band. The PCR may be any of the existing mainstream IEEE 802.11 amendments (802.11a, 802.11g, 802.11n or 802.11ac) or even other applicable future amendments (e.g. 802.11ax). The purpose of the WUR apparatus is to trigger the transition of the PCR apparatus out of sleep upon reception of a valid wake-up packet, while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one mW (milliwatt), which is much lesser compared to the active receiver power consumption of the PCR apparatus. Devices with a WUR apparatus may be called WUR devices and WUR mode may refer to operation mode where only the WUR is in operation while the PCR is turned off.

CITATION LIST

Non Patent Literature

[NPL 1] IEEE Std 802.11-2016
[NPL 2] IEEE 802.11-17/0575r11 (IEEE 802.11-15/0132r1511), Specification Framework for TGba, March 2018

DISCLOSURE SUMMARY OF INVENTION

Technical Problem

WUR access points (APs) may not be able to decode WUR frames. As such, a WUR AP may not be aware of the channel conditions in the WUR channel as well as other adverse events that a WUR STA may be experiencing (including malicious attacks), especially if the WUR channel assigned to a WUR STA is outside the PCR bandwidth of the AP.

Even if a WUR AP suspect such disruptions when a WUR STA does not respond to repeated wake-up attempts, it may not happen in a timely manner and much service disruption may have already occurred. One non-limiting and exemplary embodiment of the present disclosure facilitates proactive event/condition reporting by WUR STAB.

Solution to Problem

In an embodiment, the techniques disclosed here features: a communication apparatus comprising: a Wake Up Receiver (WURx) which, in operation, receives Wake-Up Radio (WUR) Physical Layer Protocol Data Units (PPDU) from an Access Point (AP); determination circuitry which, in operation, determines an unexpected event related to the reception of the WUR PPDU; and a Primary Connectivity Radio (PCR) transmitter which, in operation, transmits to an access point (AP) information based on the determined unexpected event.

In a further general aspect, the techniques disclosed here features: a communication apparatus comprising: a Primary Connectivity Radio (PCR) transmitter which, in operation, transmits Wake-Up Radio (WUR) Physical Layer Protocol Data Units (PPDU) to a radio station (STA); a PCR receiver which, in operation, receives information from the radio station based on an unexpected event related to transmission of the WUR PPDU; and determination circuitry which, in operation, determines based on the information whether to change a setting related to transmission of WUR PPDUs to the radio station.

In a further general aspect, the techniques disclosed here features: a communication method comprising: receiving, by a radio station (STA), Wake-Up Radio (WUR) Physical Layer Protocol Data Units (PPDU) from an Access Point (AP); determining, by the radio station (STA), an unexpected event related to reception of wake-up radio (WUR) Physical Layer Protocol Data Units (PPDU); and transmitting, by the radio station (STA), to the access point (AP) information based on the determined unexpected event.

In a further general aspect, the techniques disclosed here features: a communication method comprising: transmitting, by an access point (AP), Wake-Up Radio (WUR) Physical Layer Protocol Data Units (PPDU) to a radio station (STA); receiving, by the access point (AP), information from the radio station (STA) based on an unexpected event related to reception of wake-up radio (WUR) PPDU; and determining, by the access point, based on the information whether to change a setting related to transmission of WUR PPDUs to the radio station.

It should be noted that general or specific embodiments may be implemented as a system, a method, an integrated circuit, a computer program, a storage medium, or any selective combination thereof.

Advantageous Effects of Invention

The communication apparatus and communication method described in the present disclosure facilitate proactive event/condition reporting by WUR STAB.

Additional benefits and advantages of the disclosed embodiments will become apparent from the specification and drawings. The benefits and/or advantages may he individually obtained by the various embodiments and features of the specification and drawings, which need not all be provided in order to obtain one or more of such benefits and/or advantages.

BRIEF DESCRIPTION OF THE DRAWINGS

FIG. 3A shows the format of the wake-up signal of FIG. 2, wherein the data portion of the WUR PPDU (i.e. WUR frame 320) is transmitted in the Low Data Rate (LDR).

FIG. 3B shows the format of the wake-up signal of FIG. 2, wherein the data portion of the WUR PPDU (i.e. WUR frame 370) is transmitted in the High Data Rate (HDR).

FIG. 5 shows a table illustrating exemplary unexpected events.

FIG. 6C shows an assignment between each WUR Event Request Subelement and an ID.

FIG. 7 shows an illustration of exemplary WUR Event Request Subelements.

FIG. 8C shows a table indicating exemplary WUR Event Types and corresponding Event Counters or Event Flag.

FIG. 8D shows a table illustrating possible remedial actions by WUR AP upon receipt of WUR Event Reports.

FIG. 15C shows an illustration when a WUT STA has negotiated a PS-Mode or (U)-APSD ((unscheduled) automatic power save delivery) Power Save mode.

FIG. 18A shows an exemplary WUR Events frame Action field format.

FIG. 18B shows the WUR Action field values associated with various WUR Action frames.

FIG. 19A shows a Group Identity table for a STA Statistics request/report.

FIG. 19B shows a Triggered Reporting subelement for WUR Counters.

FIG. 19C shows a Measurement Report field for WUR Counters Group.

FIG. 20A shows a table indicating WUR events and the corresponding requests.

FIG. 20B shows the WUR Parameters field in the WUR Mode element from WUR non-AP STAs.

FIG. 20C illustrates the WUR Requests subfield.

FIG. 20D shows WUR parameters field from the WUR AP.

FIG. 20E shows the Protection field.

FIG. 21A shows a WUR operation element.

FIG. 21B shows the WUR parameters sub-field.

FIG. 21C shows the WUR Threshold sub-field.

FIG. 24B shows the WUR Mode Teardown frame Action field format.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
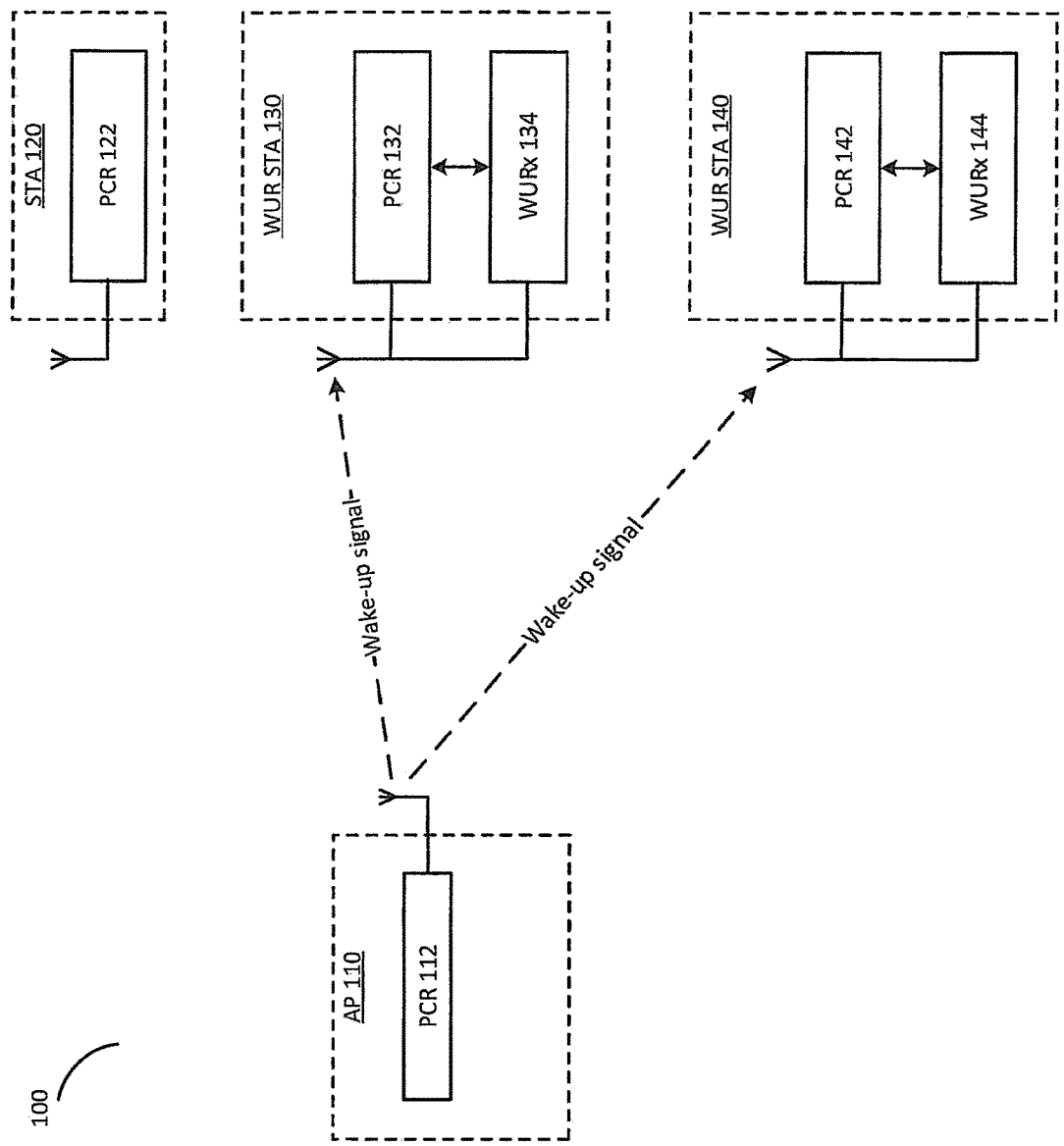
FIG. 1 shows an example of a wireless communication network in which the present disclosure may be applied.

FIG. 1 shows an example of a wireless communication network 100 in which the present disclosure may be applied. The wireless communication may be based on popular wireless standards such as IEEE 802.11. The wireless communication network 100 may comprise an Access Point (AP) 110 and three stations (STA) 120, 130 and 140. The AP 110 is equipped with a Primary Connectivity Radio (PCR) apparatus (hereinafter stated simply as "PCR") 112 which is capable of transmitting and receiving wireless signals in the 802.11 waveform (e.g. Orthogonal Frequency Division Multiplexing (OFDM)) as well as being capable of transmitting wireless signals in the Wake-up radio (WUR) waveform (e.g. On-Off Keying (OOK)). STA 120 is a legacy 802.11 device that is only equipped with a PCR 122 capable of transmitting and receiving 802.11 signals whereas STAs 130 and 140 are both WUR capable STAs and are equipped with PCRs apparatus 132 and 142 respectively as well as Wakeup radio receivers (WURx) apparatus (hereinafter stated simply as "WURx") 134 and 144 respectively. STAs 130 and 140 are capable of transmitting and receiving 802.11 signals and are also capable of receiving WUR signals. The PCRs 132 and 142 may only be turned on during active communication (PCR mode), while during period of idle listening, the PCRs may be turned off and only the WURx 134 and 144 may be operating (WUR mode). If the STAs are already associated with the AP 110, when the AP 110 needs to communicate with STAs operating in WUR mode, it may first transmit wake-up signal to instruct the STAs to transit to PCR mode by turning on the respective PCRs and switching off the WURx. Subsequently, the AP and the STAs may perform communication over the PCR. Once the communication is over, the STAs may switch back to WUR mode by switching off the PCR and turning on the WURx.

Figure 2:
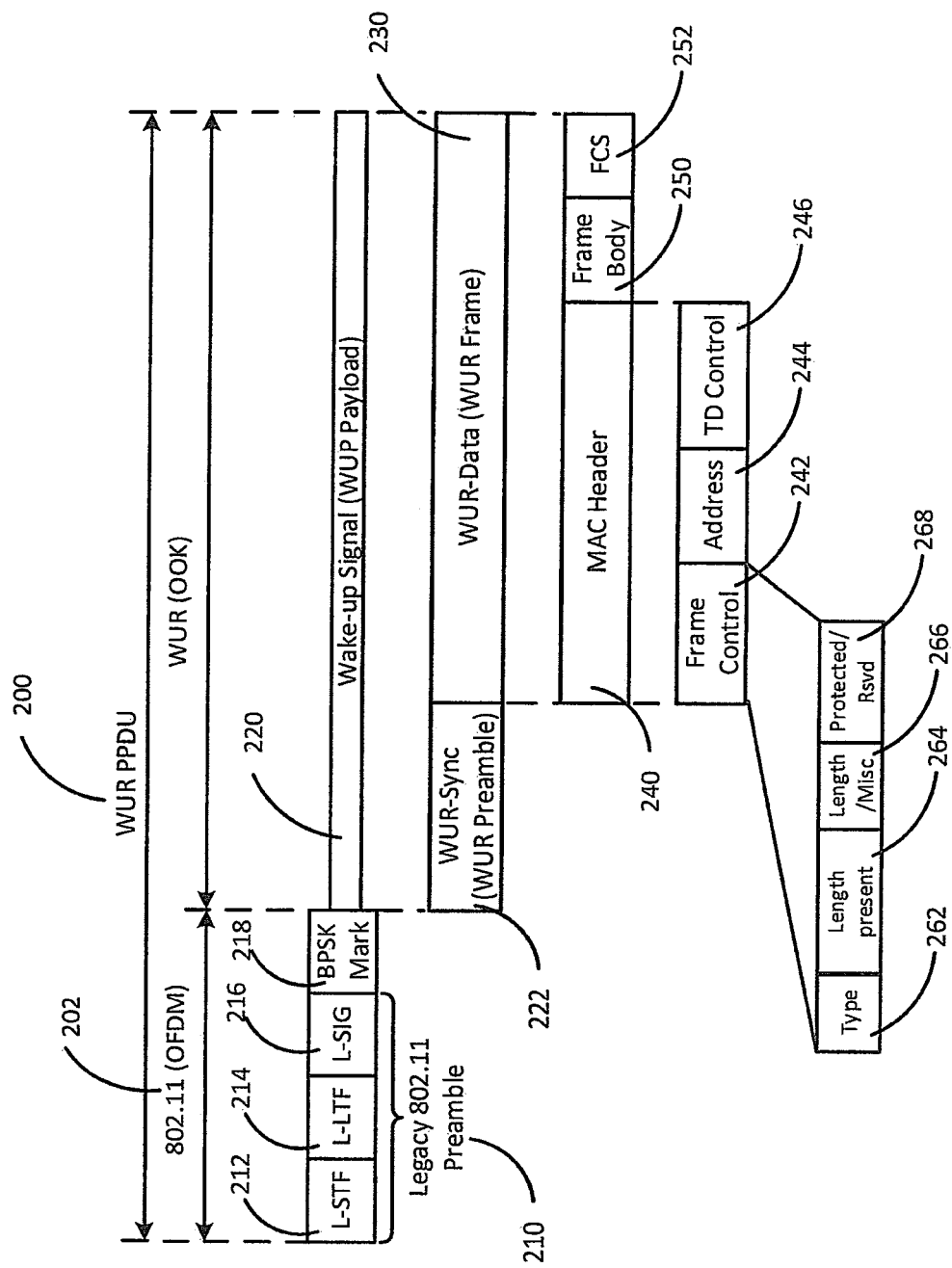
FIG. 2 shows the format of the wake-up signal being considered in the IEEE 802.11ba Taskgroup.

FIG. 2 shows the format of the wake-up signal being considered in the IEEE 802.11ba Taskgroup. The wake-up signal may be represented as the WUR PHY (physical layer) Protocol Data Unit (PPDU) 200. The WUR PPDU 200 is composed of two distinct portions. The first portion is comprised of a 20 MHz legacy (also known as non-high-throughput (HT)) 802.11 preamble 210 and one extra OFDM symbol 218 called BPSK-Mark, which are transmitted in the 802.11 OFDM waveform over the entire 20 MHz channel. The second portion is the wake-up packet (WUP) payload 220 which is transmitted in the WUR OOK waveform in a narrower sub-channel within the 20 MHz channel, for example a 4 MHz sub-channel. Although only a single WUP Payload 220 is shown in FIG. 2, it is also possible that more than one, for example three WUP Payloads, are transmitted on different, non-overlapping sub-channels within the 20 MHz channel.

The legacy 802.11 preamble 210 provides coexistence with legacy 802.11 STAs that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. The BPSK-Mark 218 of duration 4 micro-seconds modulated in Binary Phase Shift Keying (BPSK) is transmitted right after the L-SIG 216 to prevent 802.11n devices from wrongly decoding the WUR PPDU 200 as being an 802.11n packet. The WUP Payload 220 carries the actual wake-up signal and comprises a preamble portion, WUR-Sync 222 and a Data portion, WUR frame 230. The WUR-Sync 222 is used for automatic gain control (AGC), timing synchronization, packet detection etc., while the WUR frame 230 carries the control information. The WUR frame 230 may also be known as a WUR MAC (medium access control) Protocol Data Unit (MPDU) and may be further composed of various sub-fields such as a MAC header 240, a Frame check sequence (FCS) 252 as well as the optional Frame body 250. The MAC header 240 may be further comprised of a Frame control field 242, an Address field 242 that may carry either one of the Transmitter Address, Receiver address or both. Other control information may be carried in the TD Control field 246 depending on the frame Type. For example in WUR beacon frames, the TD Control field 246 may carry a timestamp field, while in unicast WUR frames, the TD Control field 246 may carry a packet number etc. The Frame control field 242 may be further comprised of a Type field 262, a Length Present field 264, a Length/Misc field 266, and a Protected/Reserved bit 268. The frame Type 262 indicates the type of the WUR frame, which may be one of the following: WUR Beacon frame, WUR Wake-up frame, WUR Vendor Specific frame or, WUR Discovery frame. The Length Present field 264 indicates whether the Length/Misc field 266 contains the Length field or not. The Length/Misc field 266 contains the Length field when the Length Present field is set to 1 and the Misc field when the Length Present field 266 is set to 0. The Length field contains the length of the Frame Body field 250. If the Protected bit 268 is set to 1, the WUR frame may be protected; otherwise, the WUR frame may be unprotected. Protected WUR frames may carry the MIC (message integrity code) in the FCS field 252. Unprotected WUR frames may carry the CRC (cyclic redundancy code) in the FCS field 252.

FIG. 3A shows the format of the wake-up signal of FIG. 2, wherein the data portion of the WUR PPDU (i.e. WUR frame 320) is transmitted in the Low Data Rate (LDR). In the LDR WUR PPDU 300, the WUR-Sync field 222 is constructed by concatenating two copies of the 32-bit sequence W 310 in the WUR waveform (OOK), followed by the WUR Frame 320 transmitted at the low data rate of 62.5 Kbps.

FIG. 3B shows the format of the wake-up signal of FIG. 2, wherein the data portion of the WUR PPDU (i.e. WUR frame 370) is transmitted in the High Data Rate (HDR). In the HDR WUR PPDU 350, the WUR-Sync field 222 is made up of the 32-bit sequence W̄ 360, which is the bit-wise complement of the 32-bit sequence W 310, followed by the WUR Frame 370 transmitted at the high data rate of 250 Kbps. As an example W 310 may be [1 0 1 0 0 1 0 0 1 0 1 1 1 0 1 1 0 0 0 1 0 1 1 1 0 0 1 1 1 0 0 01 while W̄ 360 may be [0 1 0 1 1 0 1 1 0 1 0 0 0 1 0 0 1 1 1 0 1 0 0 0 1 1 0 0 0 1 1 11.

Figure 4:
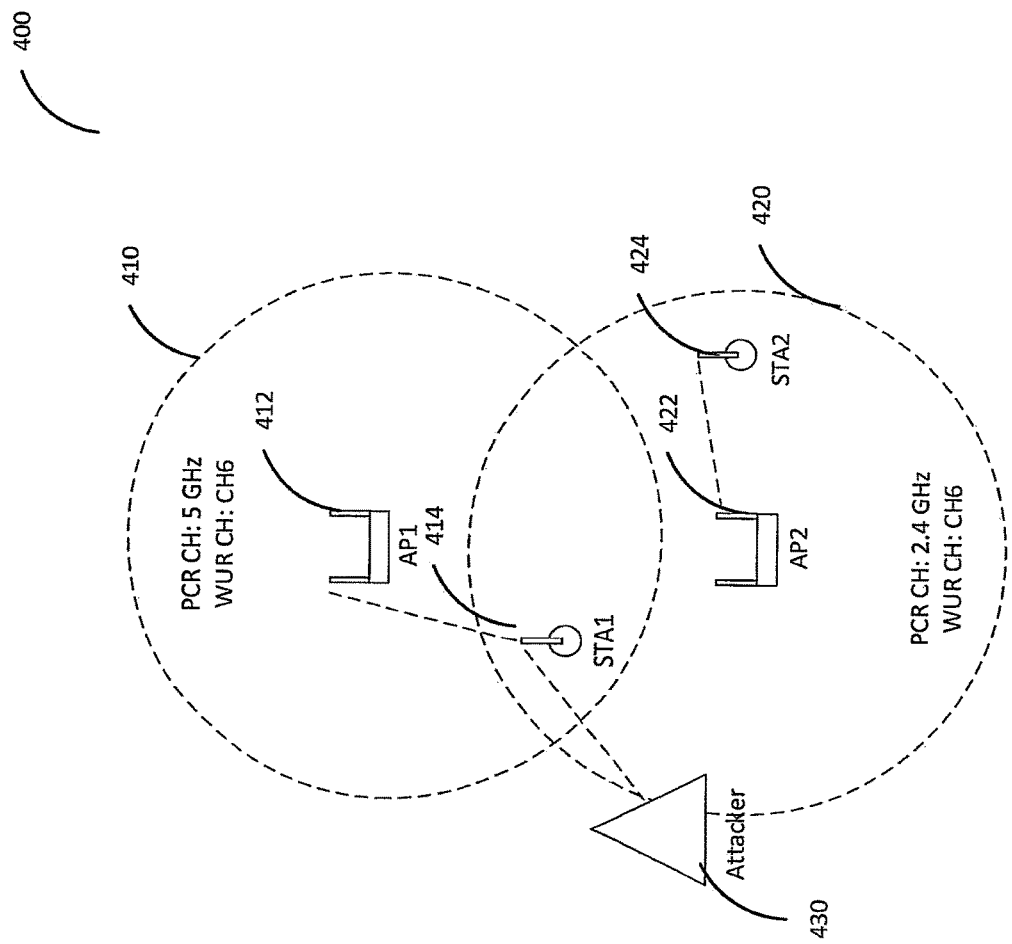
FIG. 4 shows an example wireless network deployment 400 with two overlapping Basic Service Sets (BSSs).

FIG. 4 shows an example wireless network deployment 400 with two overlapping Basic Service Sets (BSSs) 410 and 420, each with its own AP: AP1 412 and AP2 422 respectively. Both AP1 412 and AP2 422 are WUR capable APs, similar to AP 110 in FIG. 1 and are capable to transmitting in both 802.11 waveform (OFDM) as well as WUR waveform (OOK). The PCR in BSS 410 is operating in the 5 GHz band while the PCR in BSS 420 is operating in the 2.4 GHz band. Both BSS 410 and BSS 420 uses the Channel 6 in the 2.4 GHz band as the WUR channel for transmission of WUR PPDUs. A first WUR capable STA (STA1) 414 is currently associated with AP1 412. A second WUR capable STA (STA2) 424 is currently associated with AP2 422. STA1 414 may be STA 130 in FIG. 1 and is equipped with both a PCR 132 as well as a WURx 134. STA2 424 may be STA 140 in FIG. 1 and is equipped with both a PCR 142 as well as a WURx 144. As an example, each of STA1 414 and STA2 424 may be a smartphone equipped with a WURx in addition to the normal 802.11 radio. Since STA1 414 lies within the WUR range of both AP1 412 and AP2 422, it is able to receive WUR PPDUs from both APs. If AP2 422 transmits WUR PPDUs very frequently, STA1 414 may experience frequent unwanted reception on its WURx which may even interfere with the valid WUR PPDUs transmitted by its associated AP 412 and cause disruption on its wake up operation. An attacker 430 may also launch an intentional attack on the WURx of STA1 414, for example by retransmitting previously captured WUR PPDU (also known as Reply Attacks), and may cause disruptions to the normal operation of the STA1 414, like will be described in more detail below. Worse, AP 412 may be out of WUR range of AP2 422 and hence may be unaware of the adverse conditions being faced by STA1 414. Even if AP2 422 is in range, since it may not posses a WURx, AP2 422 may not be able to decode the WUR frames. In order to achieve timely recovery from such disruptions, pro-active reporting of such disrupting events/conditions by the WUR STAs is highly desirable.

Several exemplary embodiments are described in detail in later sections to describe the disclosure in detail. The various embodiments for pro-active event/condition reporting by WUR STAs as per the present disclosure are described in detail in the following sections.

In a present embodiment, the WUR STA1 414 may analyze received WUR PPDUs and in cases of "abnormal" events, the WUR STA1 414 may keep record of the events. For example, the WUR STA1 414 may maintain counters and flags to keep track of events.

FIG. 5 shows a table 500 illustrating exemplary unexpected events. The unexpected events may also be referred to as "incidences", "critical" events, "abnormal" events, or "extraordinary" events. The unexpected events all relate to a situation in which the WUR communication is not as it is expected to be under proper working conditions. A first exemplary event may be a CRC Error, for which the associated counter dot11WURCRCErrorCount may refer to the number of WUR PPDUs received with failed CRC, and which may be caused by a transmission error or wrong embedded BSSID. A second exemplary event may be a False Wake-up, for which the associated counter Dot11WURFalseWakeupCount may refer to the number of Wake-up frames that caused the STA to falsely wake its PCR, and which may be caused by address collision or intentional replay attack. A third exemplary event may be False WUR Beacon, for which the associated counter Dot11WURFalseBeaconsCount may refer to the number of WUR Beacons with Partial Timing Synchronization Function (P-TSF) value outside expected range, and which may be caused by large TSF drift or intentional fake WUR Beacon attack. Since both the False Wake-up event and the False WUR Beacon event are most likely caused due to intentional malicious attacks, it is also possible that instead of two separate events, WUT STAs may also record them as a single event type, WUR false frames with the corresponding counter dot11WURFalseFramesCount. A fourth exemplary event may be OBSS WUR Detected, for which the associated flag Dot11WUROBSSDetectedFlag may refer to a flag to record reception of OBSS WUR Beacon, and which may be caused by wrong Transmit ID in received WUR Beacons. A fifth exemplary event may be Missed WUR Beacons, for which the associated counter Dot11WURLostBeaconsCount may refer to the number of missed WUR Beacons, and which may be caused by failure to receive WUR Beacons at Target WUR Beacon Transmission Times (TWBTTs). A sixth exemplary event may be a MIC Error, for which the associated counter Dot11WURMICErrorCount may refer to the number of protected WUR frames with failed MIC, and which may be caused by authentication error or wrong embedded BSSID. A seventh exemplary event may be a Replay Attack, for which the associated counter Dot11WURReplayAttackCount may refer to the number of protected WUR frames with packet number, for example Integrity Group Temporal Key (IGTK) Packet Number (IPN)less than Replay Counter (RC), and which may be caused by IPN out of sync or intentional replay attack. Example method of the analysis of WUR PPDUs carried out by the WUR STAs and WUR events will be described in more detail further below. The unexpected events, if left unattended may cause undesirable effects on the operation of the WUR STAs or even the whole BSS. As such, appropriate remedial action (by the WUR AP) would be highly desirable. For example, the False Wake up event is very likely the cause of an intentional malicious attack and if no remedial action is taken by the WUR AP, repeated such events (false wake up) may cause the WUR STA to be depleted of its battery at a rate much faster than would be in the case of normal operation. In order to help the WUR AP to take the remedial actions, pro-active and timely feedback of such unexpected events by WUR STAs are highly desirable.

The WUR STA1 414 may inform the WUR AP1 412 of such events by sending the event report to the WUR AP1 412 using a PCR frame. The WUR STA1 414 may send the event report in an unsolicited manner (for example, when the number of a particular event exceeds a specified threshold or an event flag is set, or periodically). The threshold corresponding to each event may be a fixed value specified by the 802.11ba specification, or it may be a value set by the upper layers of a WUR STA and may also be modified upon an associated WUR AP's requests. The WUR STA1 414 may send the event report in a solicited manner (for example when explicitly solicited by the WUR AP1 412). If needed, the WUR AP1 412 may take a remedial action based on event reports, like will be described in more details further below.

In accordance with a present embodiment, the 802.11 Event Request Element may be used, which may be transmitted by the WUR AP1 412 to solicit an event report from the STA1 414 and also to set/modify the event thresholds. For example, the Event Request Action frame may be used to carry an Event Request element.

Figure 6A:
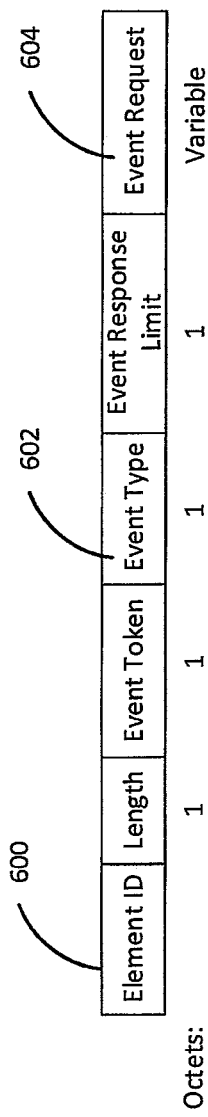
FIG. 6A shows the IEEE 802.11 Event Request Element.
Figure 6B:
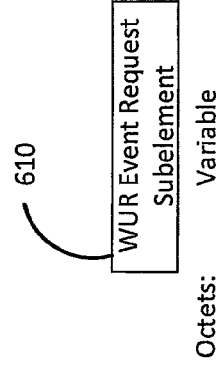
FIG. 6B shows WUR Event Request Subelements of variable length.

FIG. 6A shows the 802.11 Event Request Element 600, which may include, inter alia, an Event Type field 602 with a length of 1 octet, and an Event Request field 604 with a variable length. An unused value, for example 6 in the Event Type field 602 may be used as an indication of WUR events. When the Event Type field 602 is set to WUR Events, the Event Request field 604 may then include one or more WUR Event Request Subelements 610 of variable length, like illustrated in FIG. 6B. Each WUR Event Request Subelement 610 is assigned an ID according to the table 620 shown in FIG. 6C, which corresponds to the Event Types listed in table 500 of FIG. 5, wherein the subelements for MIC Error (ID 5) and for Replay Attack (ID 6) are only applicable for WUR STAs that are capable of receiving protected WUR frames. Thresholds for events may be provided in the WUR Event Request Subelements by the AP1 414.

FIG. 7 shows an illustration 700 of exemplary WUR Event Request Subelements, including their respective Subelement ID, length, and field for defining a threshold for reporting. In the threshold fields, the AP1 414 may specify the threshold for events in respective subelements. The threshold allows the WUR AP to control the frequency of the Event Reports generated by the WUR STAs. For example, events such as CRC Error may occur very frequently and as such the WUR AP may choose to set a comparatively high value for dot11WURCRCErrorThreshold, say 20. Whereas False Wake-up and False WUR Beacon events indicate intentional attacks and WUR AP may set the value of dot11WURFalseWake-upThreshold and dot11WURBeaconsThreshold to a relatively small number, say 3. Upon receiving an Event Request Element 600 that has the Event Type 602 set to WUR events and the Event Request field 604 carrying a WUR Event Request Subelelement, a WUR STA sets its corresponding event threshold to the value carried in the WUR Event Request Subelelement.

In accordance with the present embodiment, the 802.11 Event Report element may be used by the WUR STA1 414 to report the events. For example, 802.11 Event Report Action frames are used to carry the Event Report elements.

Figure 8A:
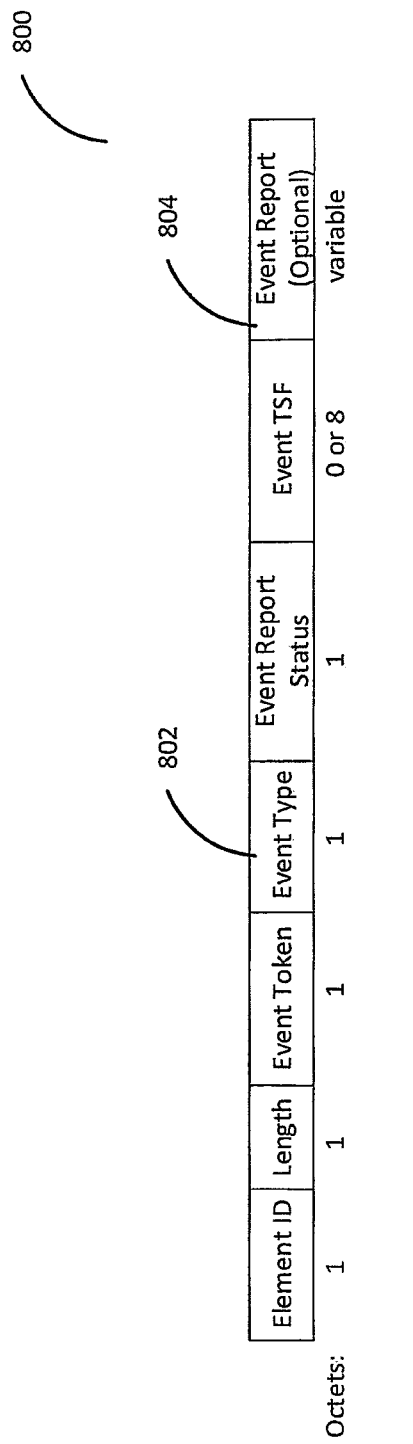
FIG. 8A shows an Event Report element used to report WUR Events.
Figure 8B:
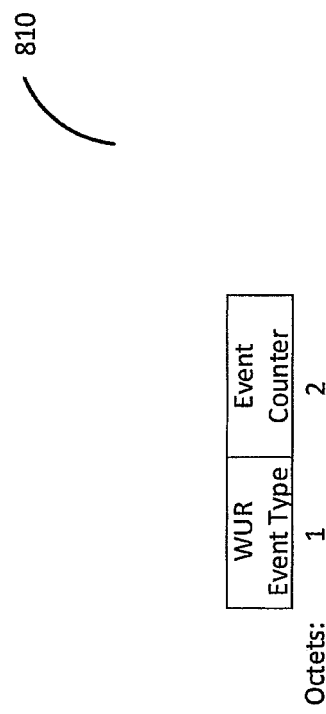
FIG. 8B shows a WUR Event Report Subelement.

FIG. 8A shows an Event Report element 800, which may, inter alia, include an Event Type field 802 with a length of 1 octet, and an optional Event Report field 804 with a variable length. A value of 6 in the Event Type field 802 may be used as an indication of WUR events. When the Event Type field 802 is set to WUR Events, the Event Report field 804 may then include one or more event reports, each event report including a WUR Event Report Subelement 810, like illustrated in FIG. 8B. Alternatively, the Event Report field 804 may only include a single event report but multiple Event Report elements may be carried in an Event Report Action frame to report multiple events at the same time. Each WUR Event Report Subelement 810 may include a WUR Event Type field of a length of 1 octet, and an Event Counter field of a length of 2 octets. FIG. 8C shows a table 820 indicating exemplary WUR Event Types and corresponding Event Counters or Event Flag. An Event Report Action frame carrying the Event Report element may be transmitted when an Event flag is set or the value of an Event Counter exceeds a specified threshold. The Event Report element includes the current value of the Event counter and may also indicate the timestamp at which the event report was generated by including the Event TSF field. A WUR AP may also solicit the current value of an Event Counter maintained by a WUR STA by transmitting an Event Request element with the threshold field set to 0. A WUR STA, upon receiving an Event Request element with the threshold field set to 0, replies with an Event Report element carrying the current value of the corresponding Event Counter (even if the Event Counter value is less than the corresponding Event Threshold).

FIG. 8D shows a table 850 illustrating possible remedial action by WUR AP upon receipt of WUR Event Reports. For remedial actions that affect the whole BSS, e.g. enabling security for WUR Beacons, changing WUR channel etc., the WUR AP may collect event reports from multiple WUR STA before taking the action. Also, prior to taking some remedial actions, the WUR AP and the WUR STA may be required to perform additional steps. For example, enabling security may also involve the 4-way handshake/Group Key handshake (if not already performed during WUR mode setup or during Association). If a WUR AP receives reports of 1 (False Wake-up) or 2 (False WUR Beacons), prior to enabling security, WUR AP may distribute new integrity Keys to the WUR STA, as will be explained in following sections.

With the disclosed mechanism, the WUR STAs are able to keep track of important events in a simple manner, and the WUR APs are able to collect relevant information necessary to make changes to WUR parameters/settings.

Figure 9:
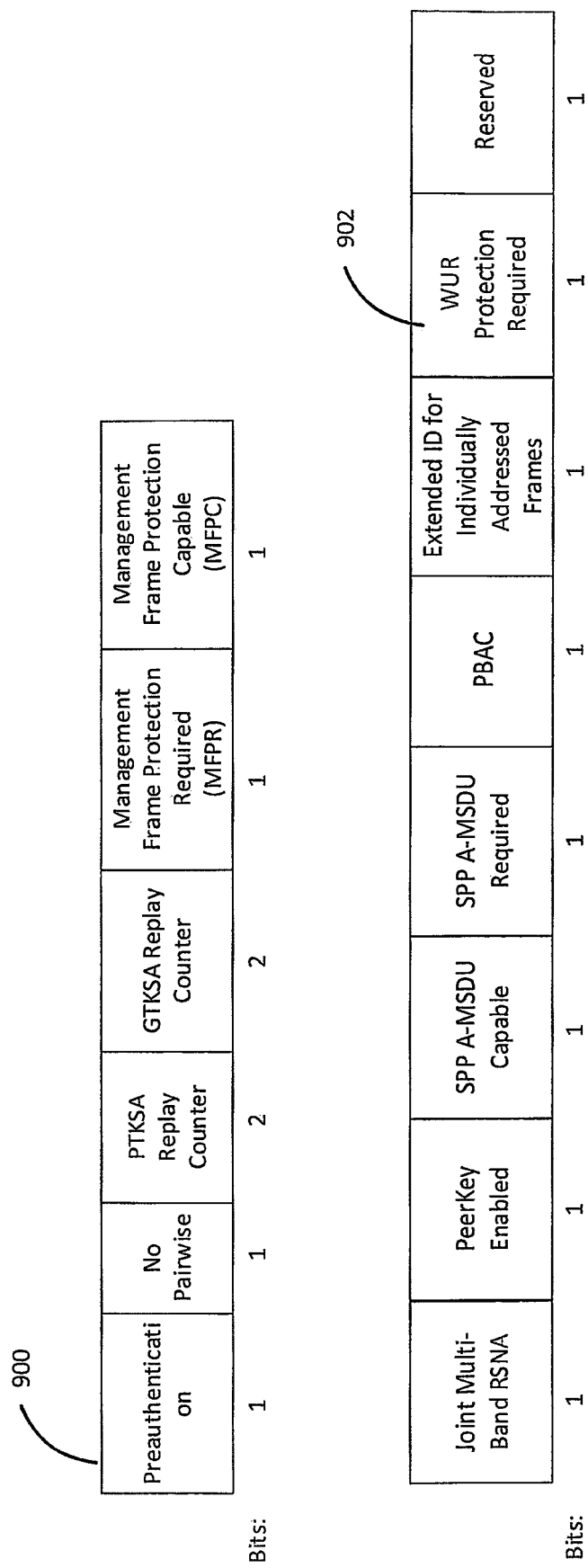
FIG. 9 shows an RSN (robust security network) capabilities field.

Earlier it was mentioned that enabling security may trigger the 4-way handshake/Group Key handshake. Alternatively, it is also possible that the integrity keys to be used for protected WUR frames are negotiated right at the time when the WUR STA first Associates with the WUR AP. FIG. 9 shows a modified RSN (robust security network) capabilities field 900 which may be used in negotiation of integrity keys (PTK (pairwise transient key) or IGTK (integrity group temporal key)) for protected WUR frames during the WUR STA's association/re-association phase (i.e. when the WUR STA first joins the BSS).

For WUR non-AP STA, if the STA sets "WUR Protection Required" bit 902 in RSN capabilities 900 to 1, during RSNA (robust security network association) establishment, the SME (station management entity) also negotiates the integrity Keys used for protection of WUR frames. For example, the SME negotiates and installs the TK (temporal key) and pairwise cipher suite for protection of individually addressed WUR frames. It also negotiates and installs the IGTK and IPN (IGTK packet number) for protection of group addressed WUR frames. Alternatively IGTK may be used for protection of both individually address and group addressed WUR frames. WUR STAs maintain an internal variable dot11WURProtectionActivated, to keep track whether Protection of WUR frames is enabled or not. It may be set by upper layer entity or may also be set by the WUR STA's MAC layer, for example when the number of False Wake-up events cross a specified threshold. A WUR STA sets the "WUR Protection Required" bit 902 in RSN capabilities field 900 to 1 if it intends to request the WUR AP to enable protection of WUR frames addressed to it.

Alternatively 2 bits may be defined for the purpose in the RSN capabilities field 900, one for unicast WUR frame: "pairwise WUR Protection Required" and one for group WUR frames: "Group WUR Protection Required". Two separate internal variables dot11WURWakeupProtectionActivated and dot11WURBeaconProtectionActivated are maintained to keep track of the protection status of WUR Wake-up frames and WUR Beacons respectively. A WUR STA sets "pairwise WUR Protection" bit to 1 if it intends to request the WUR AP to enable protection of WUR frames individually addressed to it. A WUR STA sets "Group WUR Protection" bit to 1 if it intends to request the WUR AP to enable protection of group addressed WUR frames. The "pairwise WUR Protection" bit set to 1 may trigger the negotiation of pairwise integrity keys, while the "Group WUR Protection" bit may trigger the negotiation of group integrity keys.

A WUR AP may use the "WUR Protection Required" bit in the RSN capabilities field 900 that it transmit to advertise that WUR STAB that wish to associate with the WUR AP and use WUR service should be capable of receiving protected WUR frames.

Figure 10:
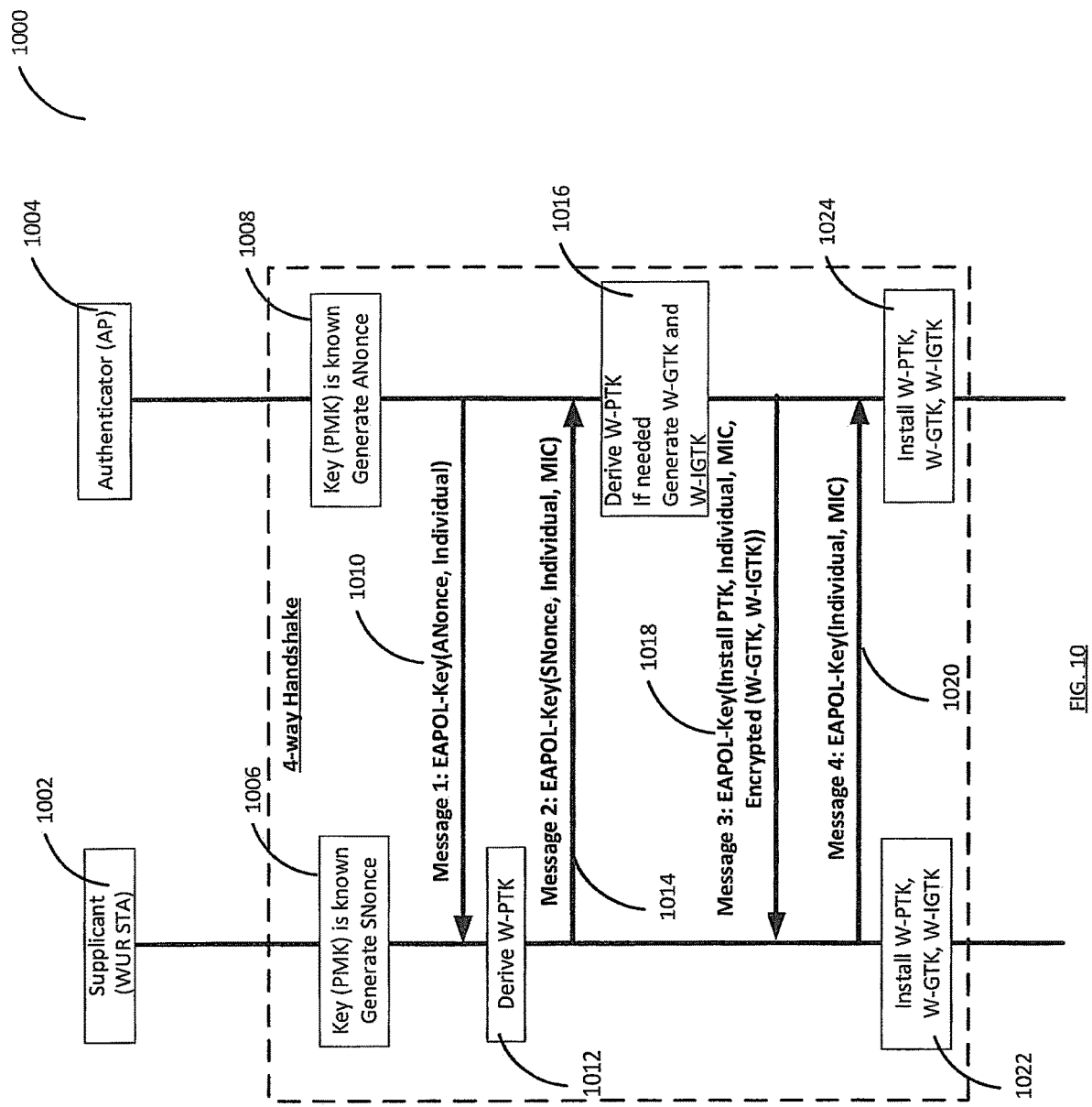
FIG. 10 shows a flow diagram illustrating additional steps for negotiation of WUR integrity keys during 4-way handshake.

FIG. 10 shows a flow diagram 1000 illustrating the additional steps for negotiation of WUR integrity keys during the 4-way handshake between a supplicant (WUR STA) 1002 and an authenticator (WUR AP) 1004 during (re) association if the "WUR Protection Required" bit 902 in the RSN capabilities field 900 is set to 1. The flow illustrated in flow diagram 1000 may also take place during WUR mode setup (if W-PTK is used for unicast WUR frames). W-PTK refers to PTK, W-GTK refers to GTK, and W-IGTK refers to IGTK negotiated for protected WUR frames. While W-PTK is used to protect individually addressed WUR frames, W-GTK and W-IGTK are used to protect group addressed WUR frames. At step 1006, the Pairwise Master Key (PMK) is known, and SNonce is generated by the Supplicant 1002. At step 1008, the key (PMK) is known, and ANonce is generated by the Authenticator 1004. The Authenticator 1004 then transmits the Message 1 (1010) which is an EAPOL-Key frame with the Key Type subfield equal to 1 (individual) and carries the ANonce. At step 1012, in addition to the PTK used for PCR communications, if the "WUR Protection Required" bit in RSN capabilities is set to 1, the W-PTK is also derived to be used for reception of individually addressed protected WUR frames. The Supplicant 1002 then transmits the message 2 (1014) which is also an EAPOL- Key frame with the Key Type subfield equal to 1 (individual) and carries the SNonce. The Key Data field shall contain an RSNE and need not be encrypted. If the "WUR Protection Required" bit in RSN capabilities is set to 1, the Authenticator 1004, in addition to the PTK and GTK and/or IGTK used for PCR communications, also derives the W-PTK, W-GTK and/or W-IGTK (at step 1016) for protection of WUR frames and includes the encrypted WUR group integrity Keys (W-GTK and/or W-IGTK) in Message 3 (1018). WUR integrity Keys are assumed to have been negotiated at the completion of the 4-way handshake (WUR STA 1002 sets an internal variable dot11WURProtectionNegotiated is set to true). However, the actual protection of WUR frames may not be activated at this stage and may need further negotiation/confirmation during the WUR Mode negotiation. Alternatively, the WUR group integrity Keys (W-GTK and/or W-IGTK) may be negotiated separately and two internal variables dot11WURPairwiseProtectionNegotiated and dot11WURGroupProtectionNegotiated may be used to track pairwise and group Key negotiations separately. Finally the Supplicant 1002 transmits Message 4 (1020) which is an encrypted EAPOL-Key frame with the Key Type subfield equal to 1 and carries an MIC. At step 1022, the supplicant 1002 installs W-PTK, W-GTK, and/or W-IGTK. At step 1024, the authenticator 1004 installs W-PTK, W-GTK, and/or W-IGTK.

Figure 11:
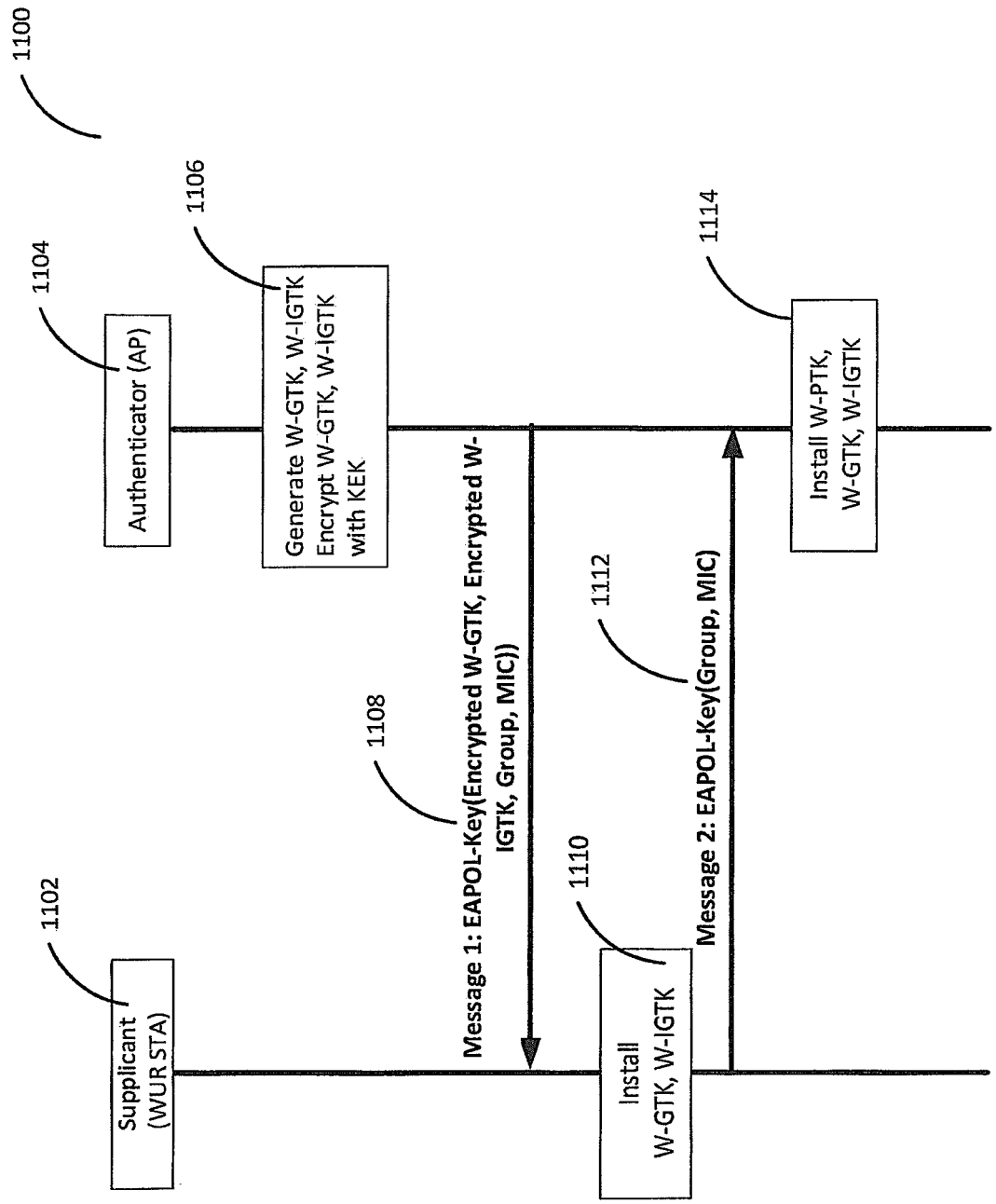
FIG. 11 shows a flow diagram illustrating a Group Key handshake during (re) association.

FIG. 11 shows a flow diagram 1100 illustrating a Group Key handshake during (re) association between a supplicant (WUR STA) 1102 and an authenticator (AP) 1104. Alternatively, Group Key handshake for WUR group integrity Keys may also take place during the WUR mode setup (for example, if group Keys are used for all protected WUR frames). Group Key handshake for WUR group integrity Keys may take place immediately after (re) association if the "WUR Protection Required" bit in RSNE capabilities was set to 1 in Message 2 of the 4-way handshake as illustrated in FIG. 10, if the WUR group integrity keys are not negotiated during the 4-way handshake 1000. Alternatively, the Group Key handshake for WUR protection may also be triggered by the Authenticator (WUR AP) 1104 upon receipt of the False wake-up or false WUR Beacon report from WUR STAB. At step 1106, the Authenticator 1104 generates W-GTK and/or W-IGTK, and encrypts W-GTK and/or W-IGTK with KEK (EAPOL-Key encryption key). Authenticator 1104 transmits Message 1 (1108) which is an EAPOL-Key frame with the Key Type subfield equal to 0 (group) and carries the Encrypted W-GTK, Encrypted W-IGTK and an MIC. At step 1110, the supplicant 1102 installs W-GTK and W-IGTK. The Supplicant 1102 acknowledges the reception of the integrity Keys by transmitting Message 2 (1112) which is an EAPOL-Key frame with the Key Type subfield equal to 0 and carries an MIC. At step 1114, the authenticator 1104 installs W-PTK, W-GTK, and W-IGTK. WUR group integrity Keys are assumed to have been negotiated at the completion of the Group Key handshake (WUR STA 1002 sets the internal variable dot11WURProtectionNegotiated is set to true).

Figure 12:
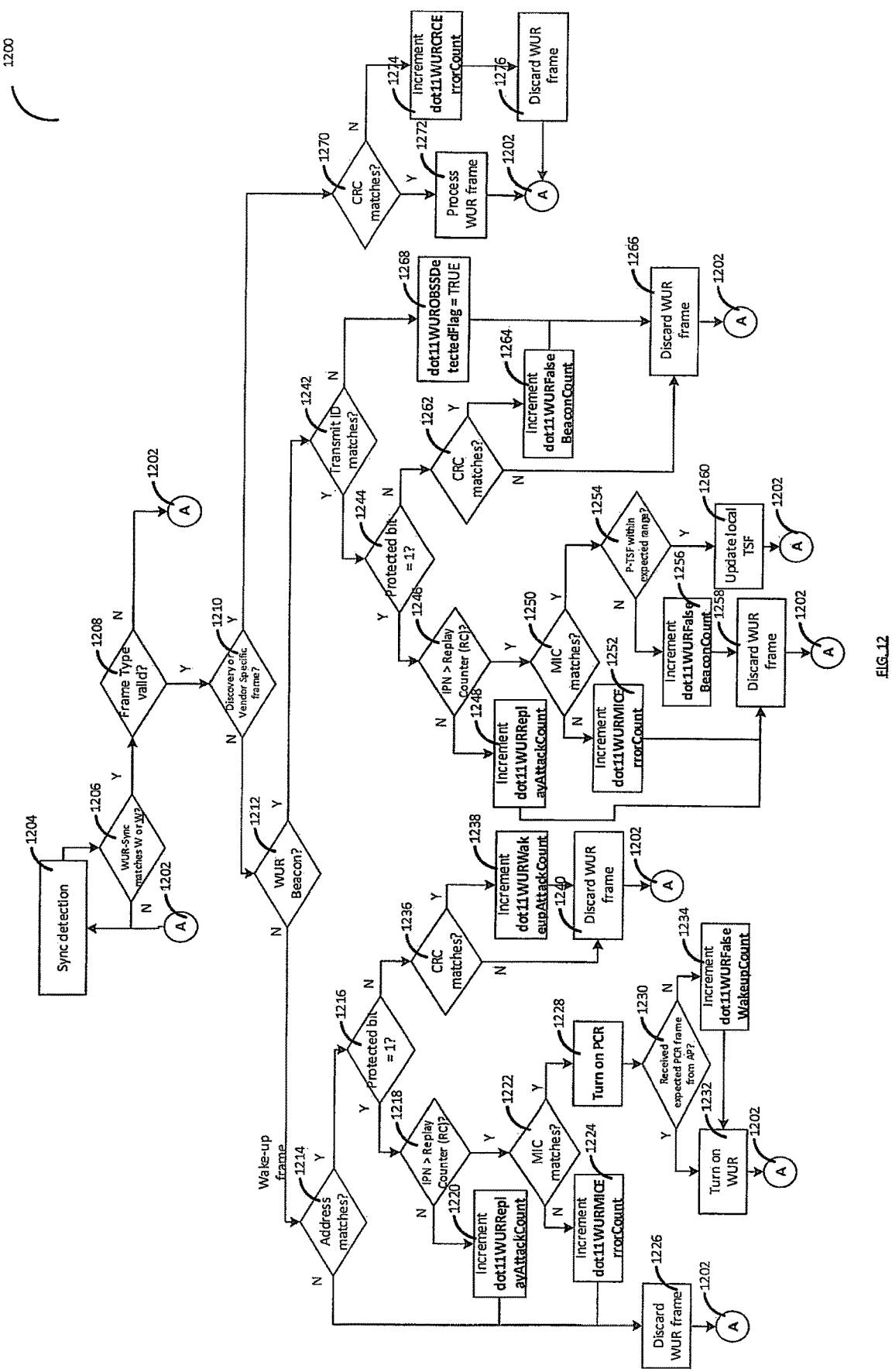
FIG. 12 shows a flow diagram illustrating a WUR STA's receiver processing flow when reception of Protected WUR frames is enabled.

FIG. 12 shows a flow diagram 1200 illustrating a WUR STA's receiver processing flow when reception of Protected WUR frames is enabled (dot11WURWakeupProtectionActivated is true). At step 1204, WUR-Sync detection may be performed. At step 1206, it may be determined whether WUR-Sync matches W 310 or ☒☒ 360. If a match is determined, processing may continue at step 1208; otherwise, processing may return to step 1204. At step 1208, based on the Frame Type field 262, it may be determined whether the frame type is valid. If it is determined that the frame type is valid, processing may continue at step 1210; otherwise, processing may return to step 1204 (via dummy step 1202, which is provided for enhanced readability of the flow diagram 1200). At step 1210, it may be determined whether the present processing is related to WUR Discovery or WUR Vendor specific frames. If it is determined that the present processing is related to WUR Discovery or WUR Vendor specific frames, processing may continue at step 1270; otherwise, processing may continue at step 1212. At step 1212, it is determined whether a WUR beacon frame is received. If it is determined that a WUR beacon frame is received, processing may continue at step 1242; otherwise (i.e. if a WUR wake-up frame is received), processing may continue at step 1214. At step 1214, it may be determined whether the address matches i.e. whether the WUR STA is an intended recipient of the WUR wake-up frame. If it is determined that the address matches, processing may continue at step 1216; otherwise, processing may continue at step 1226, where the WUR frame is discarded and processing may then proceed at step 1204. At step 1216, it may be determined whether the protected bit 268 equals 1 (i.e. the WUR wake-up frame is protected). If it is determined that the protected bit equals 1, processing may proceed at step 1218; otherwise, the processing may proceed at step 1236. At step 1218, it is determined whether the IPN associated with the received WUR frame is greater than the value of the Replay Counter (RC) maintained by the WUR STA. If it is determined that IPN is greater than RC, processing may continue at step 1222; otherwise, processing may continue at step 1220, where dot11WURReplatAttackCount
is incremented, and processing may continue at step 1226. At step 1222, it may be determined whether the MIC carried in the FCS field 252 matches. If it is determined that the MIC matches, processing may continue at step 1228; otherwise, processing may continue at step 1224, where dot11WURMICErrorCount may be incremented, and processing may continue at step 1226. At step 1228, upon determining that the received wake-up frame is valid, the WUR STA moves to PCR mode (PCR is turned on and the WURx is turned off), and processing may continue at step 1230, where it is determined whether the expected PCR frame is received from the AP. If it is determined that the expected PCR frame is received from the AP, processing may continue at step 1232, where the WUR STA returns to WUR mode (PCR is turned off and WURx is turned on), and processing then proceeds at step 1204; otherwise, processing continues at step 1234, where it is determined that the WUR STA has been falsely woken up and dot11WURFalseWakeupCount is incremented, and then processing proceeds at step 1232. At step 1236, it may be determined whether CRC matches. If it is determined that CRC matches, processing may continue at step 1238, where dot11WURWakeupAttackCount is incremented, and then processing continues at step 1240, where the WUR frame is discarded, and then processing continues at step 1204; otherwise, processing may directly proceed to step 1240. At step 1244, it may be determined whether the protected bit 268 equals 1. If it is determined that the protected bit 268 equals 1, processing may proceed at step 1246; otherwise, the processing may proceed at step 1262. At step 1246, it is determined whether IPN is greater than the Replay Counter (RC). If it is determined that IPN is greater than RC, processing may continue at step 1250; otherwise, processing may continue at step 1248, where dot11WURReplatAttackCount is incremented, and processing may continue at step 1258. At step 1250, it may be determined whether MIC matches. If it is determined that MIC matches, processing may continue at step 1254; otherwise, processing may continue at step 1252, where dot11WURMICErrorCount is incremented, and processing may continue at step 1258. At step 1254, it may be determined whether P-TSF is within the expected range. If it is determined that P-TSF is within the expected range, processing may continue at step 1260, where the local TSF is updated and processing then proceeds to step 1204; otherwise, processing may continue at step 1256, where dot11WURFalseBeaconCount is incremented and processing then continues at step 1258. At step 1258, the WUR frame may be discarded, and processing may return to step 1204. At step 1262, it may be determined whether CRC matches. If it is determined that CRC matches, processing may proceed to step 1264; otherwise, processing may proceed to step 1266. At step 1264, dot11WURFalseBeaconCount is incremented, and processing may continue at step 1266. At step 1266, the WUR frame may be discarded, and processing may return to step 1204. At step 1268, dot11WUROBSSDetectedFlag is set to TRUE, and processing may continue at step 1266. At step 1270, it may be determined whether the CRC matches. If the CRC matches, processing may continue at step 1272, where the WUR frame is processed and then processing returns to step 1204; otherwise, dot11WURCRCErrorCount is incremented at step 1274, the WUR frame may be discarded at step 1276, and processing may return to step 1204.

Like illustrated in FIG. 12, if WUR frame protection is enabled (i.e. dot11WURWakeupProtectionActivated is true), WUR frames that are received without protection (i.e. with the protected bit 268 equal to 0) shall be discarded. The additional counter "dot11WURWakeupAttackCount" is introduced to keep track of suspected "replay attack" unprotected WUR frames that the WUR STA continues to receive even after Protection is enabled. Essentially the counter is incremented every time an unprotected wake up frames that matches STA's WID is received after protection is negotiated. Some counters, like dot11WURWakeupAttackCount, dot11WURReplayAttackCount and dot11WURMICErrorCount, if not updated for a long time, may indicate that the "Attack" has subsided. WUR STA may use this information to request WUR AP to turn off Protection for WUR frames. Since both dot11WURFalseBeaconCount and dot11WURFalseWakeupCount is likely a result of replay attacks, WUR STAB may also choose to maintain a single counter dot11WURFalseWURCount for both events. Similarly, the corresponding event type may be consolidated as a single event: False WUR frame.

Figure 13:
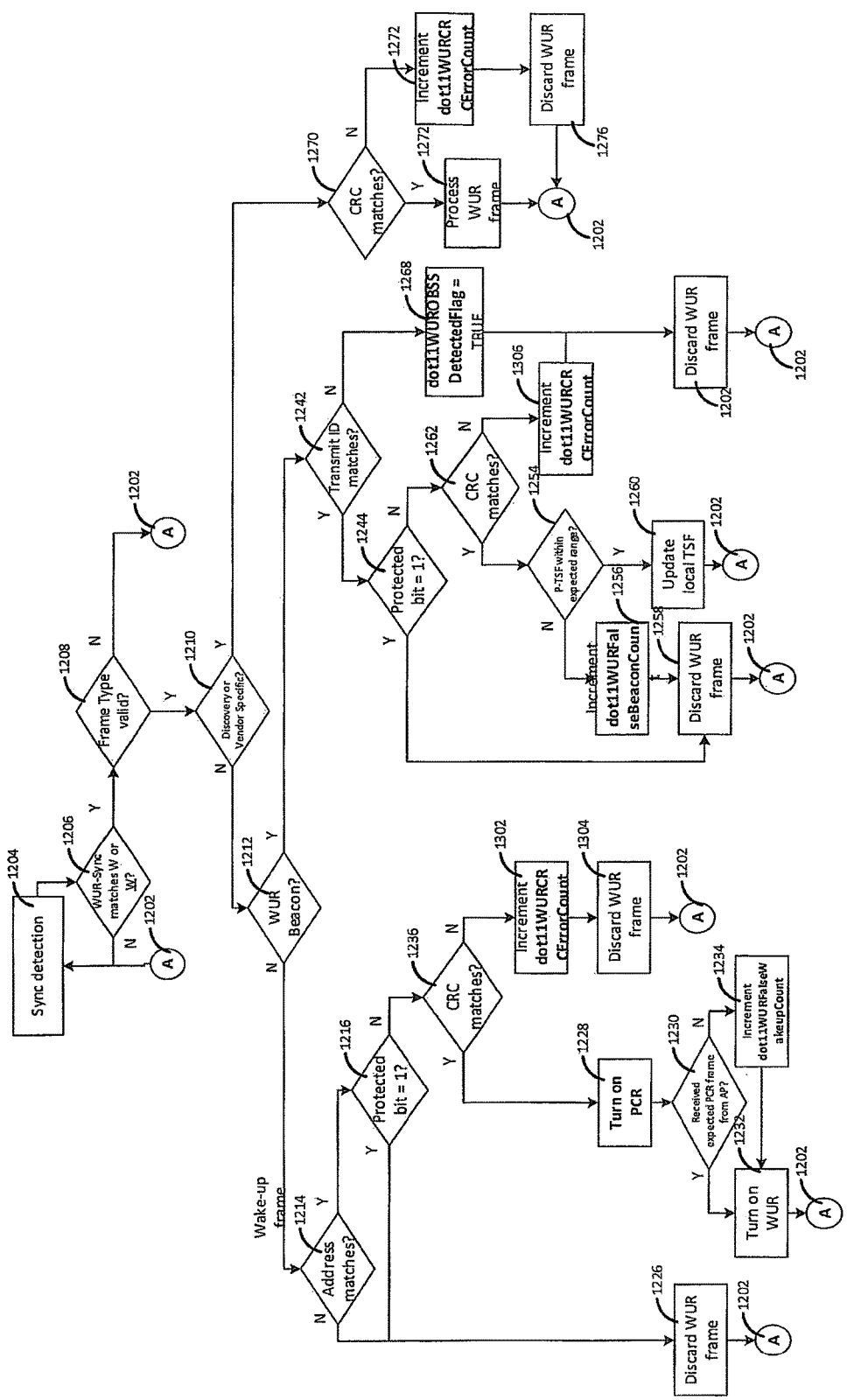
FIG. 13 shows a flow diagram illustrating a WUR STA's receiver processing flow when reception of Protected WUR frames is not enabled.

FIG. 13 shows a flow diagram 1300 illustrating a WUR STA's receiver processing flow when reception of Protected WUR frames is not enabled (dot11WURWakeupProtectionActivated is false). If the WUR STA has not negotiated WUR frame protection, it may discard "protected" WUR frames (i.e. WUR frames with the protected bit 268 equal to 1) as shown by the Yes arms at step 1216 and step 1244. Various steps illustrated in FIG. 13 are identical or similar to steps illustrated in FIG. 12, so that the same reference signs may be used and duplicate description may be omitted. At step 1236, it may be determined whether CRC matches. If it is determined that CRC matches, processing may continue at step 1228, otherwise processing may continue at step 1302. At step 1302, dot11WURCRCErrorCount may be incremented, and at step 1304, the WUR frame may be discarded. At step 1262, it may be determined whether CRC matches. If it is determined that CRC matches, processing may proceed to step 1254; otherwise, processing may proceed to step 1306. At step 1306, dot11WURCRCErrorCount may be incremented.

Figure 14:
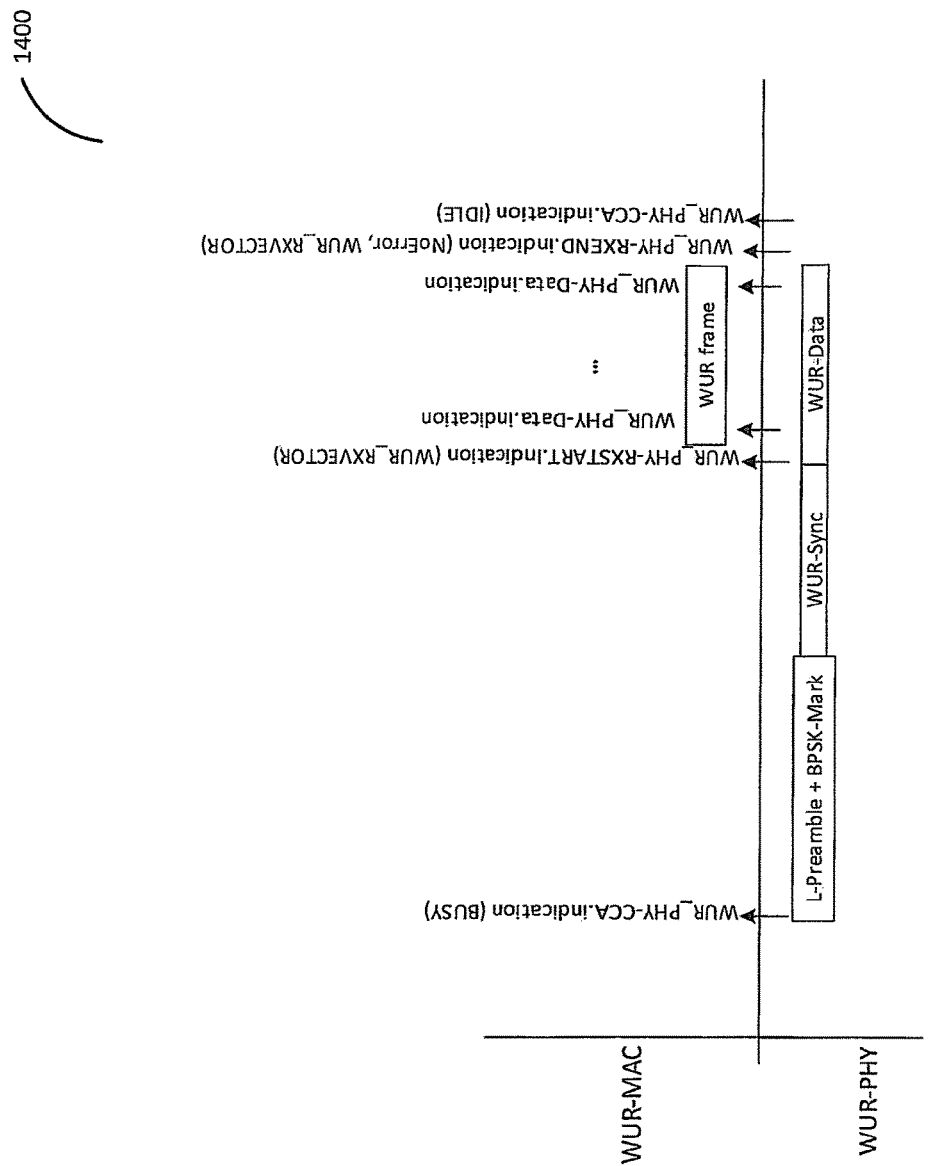
FIG. 14 shows an illustration of PHY primitives used to notify the MAC layer of reception of WUR PPDU (without error).

FIG. 14 shows an illustration 1400 of PHY primitives used to notify the MAC layer of reception of WUR PPDU (without error). The WUR_PHY-CCA.indication primitive with BUSY status is used by the WUR-PHY to indicate to WUR-MAC that the WURx has detected energy on the WUR channel at power level above the CCA sensitivity level. Similarly the WUR_PHY-RXSTART.indication primitive and the corresponding WUR_RXVECTOR is used to inform the WUR-MAC of the start of the WUR-Data field of the WUR PPDU. The WUR_RXVECTOR carries parameters such as WUR_DATARATE etc. The WUR_PHY-Data.indication primitives are used to pass the received WUR frame to the WUR-MAC, one octet at a time. Finally, the WUR_PHY-RXEND.indication primitive is issued to indicate the end of the WUR PPDU. The analysis of the WUR PPDU by the WUR-MAC may be triggered by the receipt of the WUR_PHY-RXEND.indication primitive.

Figure 15A:
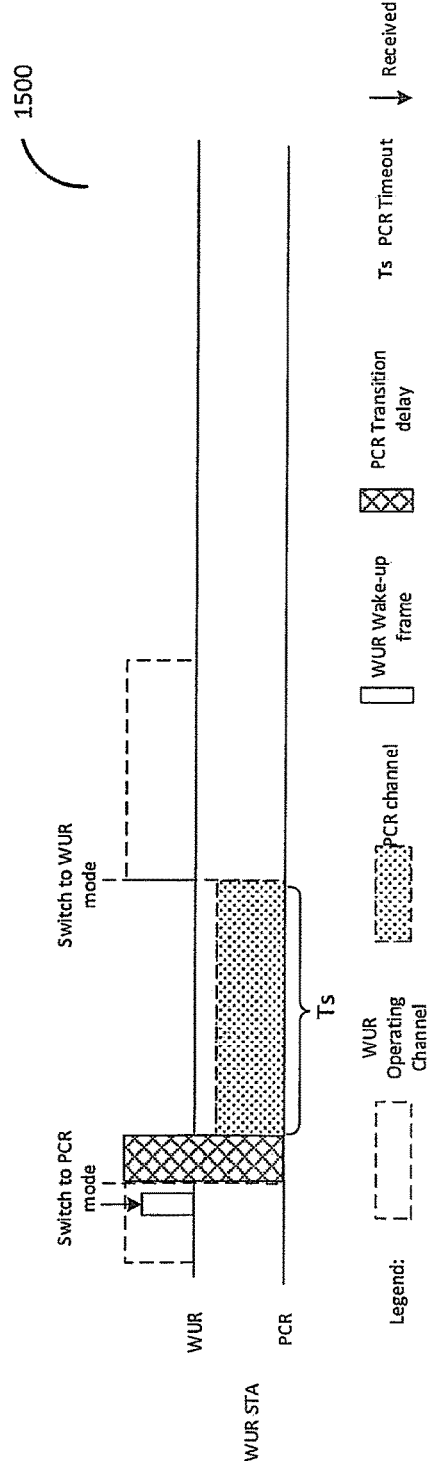
FIG. 15A show an illustration of wake up for (DTIM) Beacon.
Figure 15B:
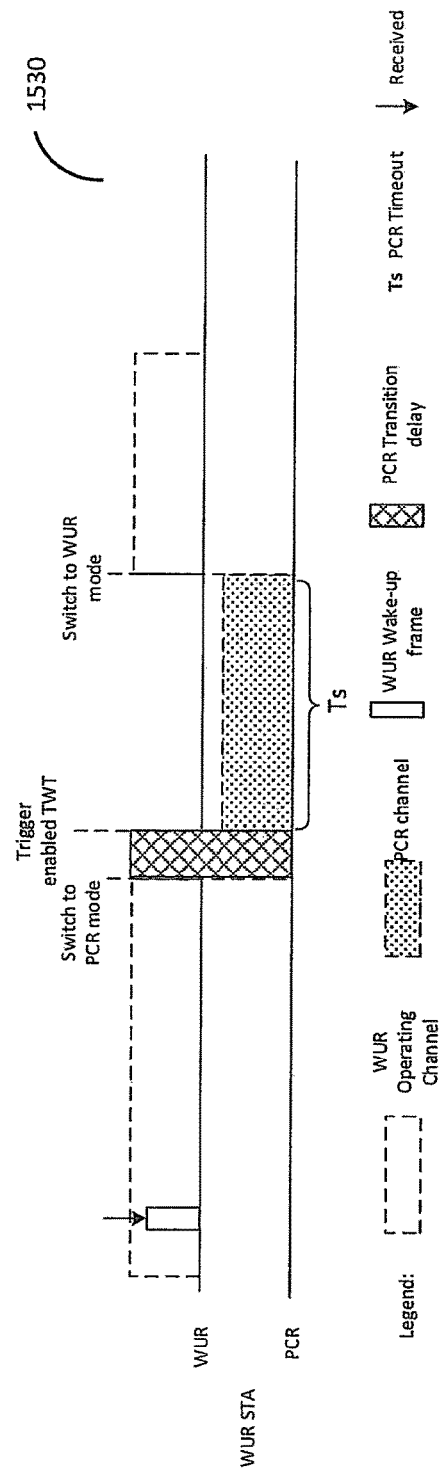
FIG. 15B shows an illustration 1530 of a scheduled (trigger enabled) Target Wake Time (TWT).

FIGS. 15A, 15B and 15C illustrate example scenarios of false wakeups. FIG. 15A show an illustration 1500 of wake up for (DTIM) Beacon frames. Upon receiving a valid WUR wake-up frame with indication to receive (DTIM) Beacon frames, the WUR STA turns on its PCR in time for the scheduled Target Beacon Transmission Time (TBTT) of (DTIM) Beacon frames factoring the PCR transition delay as well as clock drifts. Failure to receive (DTIM) Beacon frames within a pre-defined PCR Timeout, Ts or receiving the DTIM Beacon frame but not receiving the subsequent group address frames (when the WUR wake-up frame indicated wake up for group address frames), or the received Beacon frame not carrying the expected updated parameters (when the WUR wake-up frame carries an updated "Beacon counter") indicates false wake up. This also applies for all unicast/group wake ups that causes the WUR STA to wake up immediately but does not require the WUR STA to transmit any uplink PCR frame. The PCR Timeout, Ts in this case may need to be configured by the upper layer (for example via a MIB dot11PCRtimeout). The PCR Timeout, Ts should be short enough to avoid causing the WUR STA to wait too long for PCR frames, while it should be long enough to factor in possible transmission delays at the AP due to channel access delays etc. FIG. 15B shows an illustration 1530 of a scheduled (trigger enabled) Target Wale Time (TWT). When a WUT STA has negotiated a schedule (trigger enabled) TWT, upon receiving a valid WUR wake-up frame, the WURSTA turns on its PCR in time for the scheduled TWT factoring the PCR transition delay as well as clock drifts, expecting to receive a Trigger frame at the start of the TWT window. Failure to receive a Trigger frame assigning Resource Unit (RU) for the WUR STA within Ts indicates a false wake up. For non-trigger enabled TWTs, failure to receive the expected PCR frame from AP indicates false wakeup. Trigger enabled TWT is a new feature introduced in 802.11ax. Ts in this case may be equal to the duration of the TWT Service Period (SP). FIG. 15C shows an illustration 1560 when a WUT STA has negotiated a PS-Mode or (U)-APSD ((unscheduled) automatic power save delivery) Power Save mode. Upon receiving a valid WUR wake-up frame and turning on its PCR, if the WUR STA receives an ACK frame or a QoS-Null frame that has the "More Data subfield" in Frame Control set to 0, in response to the initial PS-Poll frame or Trigger frame transmitted by the WUR STA, false wakeup may be assumed. If scheduled APSD has been set up, the STA wakes up at the scheduled start time of its Service Period (SP) and waits for transmission from AP. Ts in this case is equal to the duration of the scheduled SP.

Figure 16:
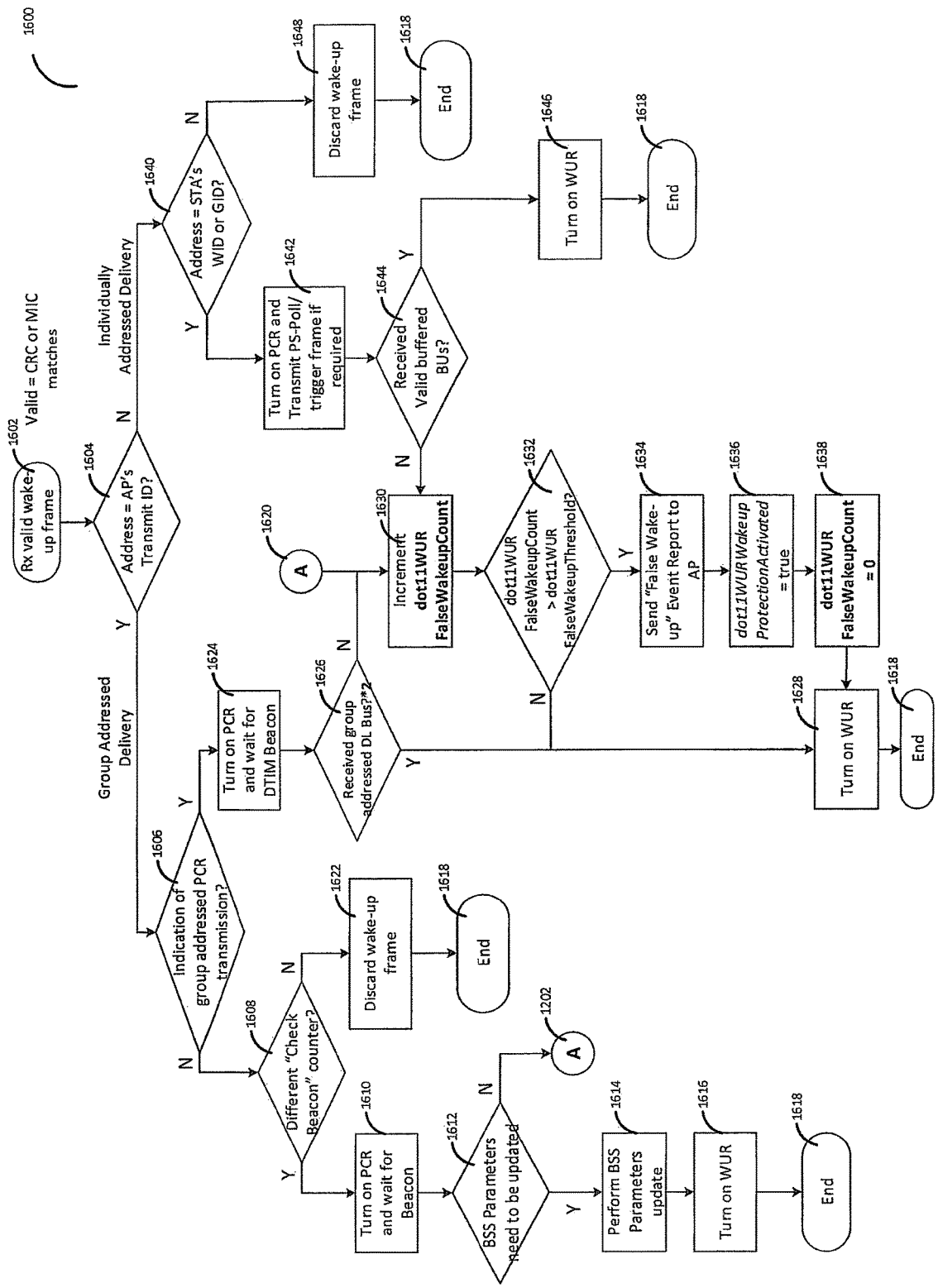
FIG. 16 shows a flow diagram illustrating a detailed WUR STA's Receiver processing flow to detect false wakeups.

FIG. 16 shows a flow diagram 1600 illustrating a detailed WUR STA's Receiver processing flow to detect false wake-ups (which is expanded from the relevant section of FIG. 12). At step 1602, a valid WUR wake-up frame (i.e. a WUR wake-up frame for which CRC or MIC matches) is received. At step 1604, it is determined whether the frame's address is identical to the transmit ID of the AP. If it is determined that the frame's address is identical to the transmit ID of the AP, group addressed delivery is assumed and processing may continue at step 1606; otherwise (i.e. individually addressed delivery is assumed), processing may continue at step 1640. At step 1606, it is determined whether there is an indication of group addressed PCR transmission. If it is determined that there is an indication of group addressed PCR transmission, processing may continue at step 1624; otherwise, processing may continue at step 1608. At step 1608, it may be determined whether the TD Control field 246 of the WUR frame carries a "Beacon counter" that has a different value from the local "Beacon counter". If it is determined that there is a different "Beacon counter", processing may continue at step 1610; otherwise, processing may continue at step 1622, where the wake-up frame is discarded and then processing ends (step 1618). At step 1610, the PCR may be turned on and the WUR STA waits for a Beacon frame. At step 1612, based on the received Beacon frame, it is determined whether any BSS parameters need to be updated. If it is determined that BSS parameters need to be updated, processing may continue at step 1614; otherwise, processing may continue at step 1630 (via dummy step 1620, which is introduced in FIG. 16 to increase readability of the flow diagram 1600). At step 1614, a BSS parameter update is performed. At 1616, WURx may be turned on and the PCR turned off, and then processing may end (step 1618). At step 1624, the PCR may be turned on and the WUR STA waits for a DTIM Beacon. At step 1626, it is determined whether group addressed downlink Buffered Units (BUs) are received following the reception of DTIM Beacon (reception should be within "PCR Timeout"). If it is determined that a group addressed downlink Buffered Units (BUs) have been received, processing may continue at step 1628, where the PCR is turned off, the WURx is turned on and then processing ends (at step 1618); otherwise, processing may continue at step 1630. At step 1630, failure to receive group addressed downlink Buffered Units (BUs) indicates that the WUR STA has been falsely woken up and dot11WURFalseWakeupCount is incremented. At step 1632, it is determined whether dot11WURFalseWakupCount is larger than dot11WURFalseWakeupThreshold. If it is determined that dot11WURFalseWakupCount is larger than dot11WURFalseWakeupThreshold, processing continues at step 1634; otherwise, processing continues at step 1628. At step 1634, a "False Wakeup" Event Report is sent to the. At step 1636 upon receiving acknowledgement of the receipt of the "False Wakeup" Event Report by the WUR AP, the internal variable dot11WURWakeupProtectionActivated is set to TRUE. At step 1638, dot11WURFalseWakeupCount is reset (for example set to 0) and processing may continue at step 1628. At step 1640, it is determined whether the frame's address is identical to the STA's WID or GID (group identifier). If it is determined that the frame's address is identical to the STA's WID or GID, processing may continue at step 1642; otherwise, processing may continue at step 1648. At step 1642, the PCR is turned on (wherein it will be understood that the STA may also turn on the PCR at scheduled times, for example for TWT or next TBTT) and the PS-Poll/trigger frame is transmitted, if required. At step 1644, it is determined whether valid buffered BUs are received (wherein reception should be within "PCR Timeout". In some case absence of Trigger frame reception may be considered, for example during triggered TWT). If it is determined that valid buffered BUs are received, processing may continue at step 1646, where the WUR is turned on and then processing ends (at step 1618); otherwise, processing may continue at step 1630. At step 1648, the wake-up frame is discarded and then processing ends (at step 1618). Since there is a small chance of a genuine wake-up being classified as a false wake-up (e.g. AP is not able to gain access to channel for transmission of DL frames to STA etc.), to avoid event report trigger due to long term accumulation of counter increments, the event counters may be flushed (in other words: reset; for example set to zero) with regular periodicity (e.g. once a day etc.).

Figure 17A:
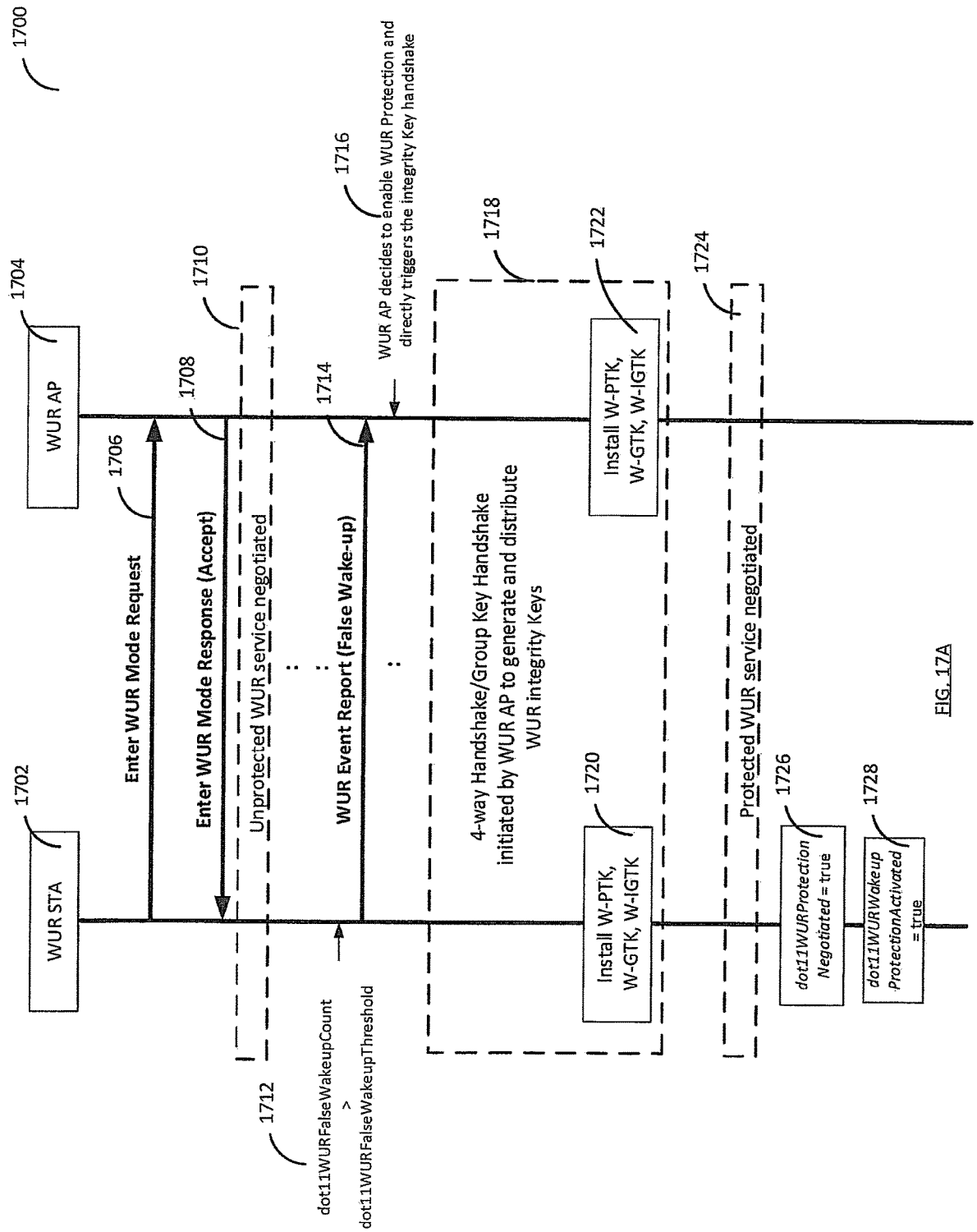
FIG. 17A shows a flow diagram illustrating an example message sequence showing WUR AP initiated setup of Protected WUR service upon receipt of False Wakeup Event Report from WUR STAB.

FIG. 17A shows a flow diagram 1700 illustrating an example message sequence showing WUR AP 1704 initiated setup of Protected WUR service upon receipt of False Wakeup Event Report from WUR STAs, without tearing down existing unprotected WUR service. A WUR STA 1702 may send an Enter WUR Mode Request 1706 to the WUR AP 1704. The WUR AP 1704 may respond with an Enter WUR Mode Response (Accept) message 1708, thereby indicating that unprotected WUR service has been negotiated. Here, unprotected WUR service refers to the fact that during the WUR service, the WUR AP only transmits unprotected WUR frames (i.e. WUR frames with the protected bit 268 equal to 0) to the WUR STA. WUR STAs that have completed the negotiation of unprotected WUR service with a WUR AP may be said to be in unprotected WUR Mode. If the WUR STA 1702 records false wakeup events and the dot11WURFalseWakeupCount is larger than dot11WURFaleWakeupThreshold (step 1712), the WUR STA 1702 may transmit a WUR Event Report (with a False Wake-up indication) 1714 to the WUR AP 1704. At step 1716, upon receiving the WUR Event Report (with a False Wake-up indication) 1714, the WUR AP 1704 may decide to enable WUR protection and may trigger the integrity key handshake. Like indicated by box 1718, a 4 Way Handshake or Group Key Handshake, like illustrated in FIGS. 10 and 11, may be initiated by the WUR AP 1704 to generate and distribute WUR integrity keys. At step 1720, the WUR STA 1702 installs W-PTK, W-GTK, and W-IGTK. At step 1722, the WUR AP 1704 installs W-PTK, W-GTK, and W-IGTK. Completion of the handshake 1718 indicates that protected WUR service has been negotiated. Here, protected WUR service refers to the fact that during the WUR service, the WUR AP will transmit protected WUR frames (i.e. applicable WUR frames with the protected bit 268 equal to 1) to the WUR STA. WUR STAs that have completed the negotiation of protected WUR service with a WUR AP may be said to be in protected WUR Mode. At step 1726, the WUR STA 1702 may set dot11WURProtectionNegotiated to TRUE to record the successful completion of WUR integrity Keys negotiation. Here, Protected WUR service may be considered negotiated upon successful completion of the integrity Key handshake, and an explicit indication from the WUR AP 1704 that protected WUR service has been set up may not be required. At step 1728, the WUR STA 1702 may also set dot11WURProtectionActivated to TRUE to record that protected WUR service has been negotiated. Once protected WUR service is negotiated, all unprotected WUR frames are simply discarded by the WUR STA. In protected WUR service, transmission of group addressed WUR frames are not allowed if the group includes both protection enabled WUR STAs and protection not-enabled/incapable WUR STAs.

Figure 17B:
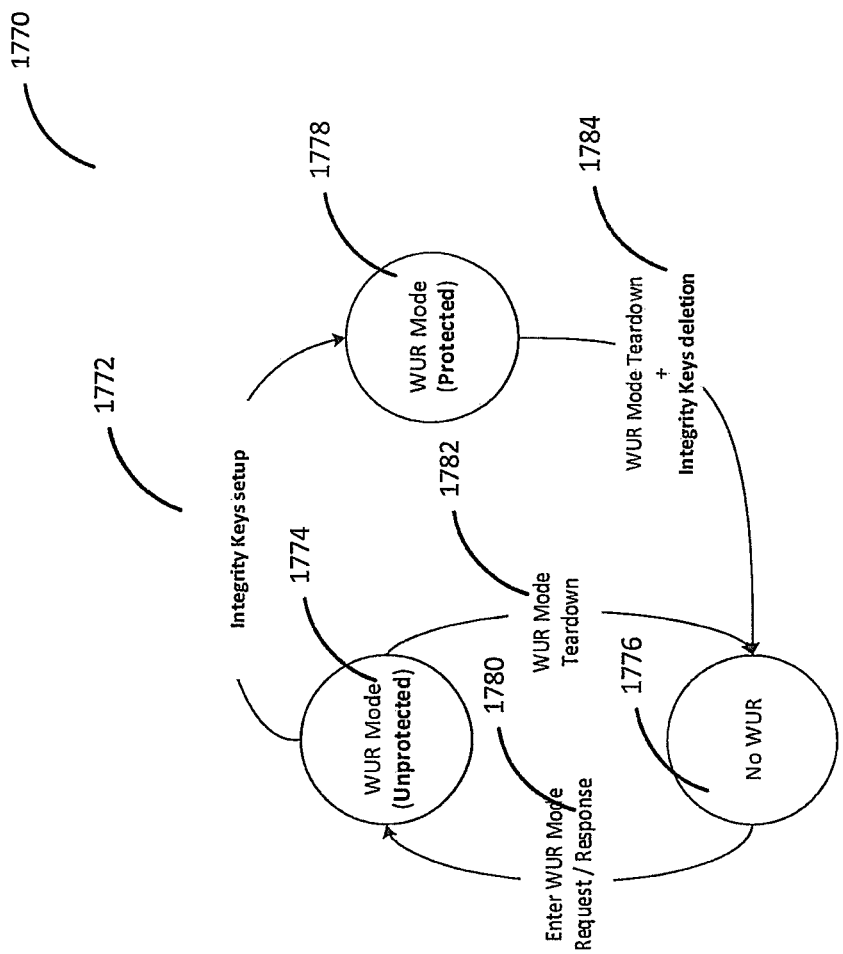
FIG. 17B shows an illustration of a state machine corresponding to the flow diagram \ of FIG. 17A.

FIG. 17B shows an illustration 1770 of a state machine corresponding to the flow diagram 1700 of FIG. 17A, with states "No WUR" 1776, "WUR Mode (Unprotected)" 1774, and "WUR Mode (Protected)" 1778, and with transitions "Enter WUR Mode Request/Response" 1780, "WUR Mode Teardown" 1782, "Integrity Keys setup" 1772, and "WUR Mode Teardown and Integrity Keys deletion" 1784. Completion of the integrity Key handshake initiated by the WUR AP (transition 1774) directly moves the WUR STA from the unprotected WUR Mode 1774 to the protected WUR Mode 1778.

Figure 18C:
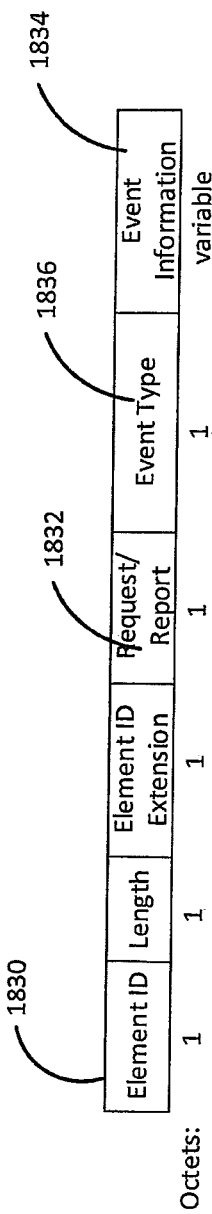
FIG. 18C shows the WUR Event element.
Figure 18D:
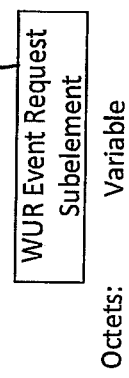
FIG. 18D shows the content of the event information for requests.
Figure 18E:
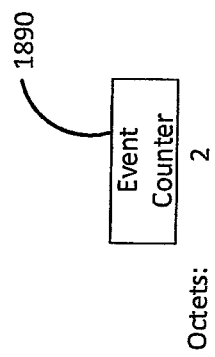
FIG. 18E shows the content of the event information for reports.

In accordance with a present embodiment, instead of reusing 802.11 Event Request/Report elements, a new WUR Action frame (WUR Events frame) and a new WUR Event element are defined, like illustrated in FIGS. 18A, 18B, 18C, 18D, and 18E. FIG. 18A shows an exemplary WUR Events frame Action field format 1800, including, inter alia, a WUR Action field 1802 and a WUR Events element 1804. FIG. 18B shows a table 1820 listing the WUR Action field values associated with various WUR Action frames, wherein value 2 may be related to WUR Events Action frame. FIG. 18C shows the WUR Event element 1830, which may include a Request/Report indicator field 1832 for differentiating requests and reports, and corresponding event information 1834. The Event Type field 1836 indicates the type of the Event and may be any of the types listed in the Event Type column in Table 820 in FIG. 8C. FIG. 18D shows the content 1880 of the event information 1834 for requests and may be the same as 610 in FIG. 6B. FIG. 18E shows the content 1890 of the event information 1834 for reports and may carry the counters listed in the Event Counters column in Table 820 in FIG. 8c except that in the Event Report for WUR Event 3 (OBSS WUR Detected), the dot11WUROBSSDetectedFlag is replaced with dot11WUROBSSDetectedCount: Counter to record number of unique OBSS WUR Beacons. Optionally, a list of Transmit IDs of the OBSS WUR Beacons may also be carried in the Report element. This may provide that the Event Reporting format is similar to other WUR Action frames.

In accordance with a present embodiment, instead of an event request/report, STA Statistics request report carried in 802.11 Radio Measurement Request/Report elements may be used, like illustrated in FIGS. 19A, 19B, and 19C. FIG. 19A shows a Group Identity table for a STA Statistics request/report, including a WUR counters group 1902 for WUR. The WUR AP may transmit STA a Statistics Request to solicit Statistic Report. FIG. 19B shows a Triggered Reporting subelement 1920 for WUR Counters, including optional threshold fields defined for WUR (indicated by box 1922). A WUR AP may transmit a frame carrying the Triggered Reporting subelement 1920 to a WUR STA to set the various event thresholds. The WUR STA may reply with a STA Statistic Report. FIG. 19C shows a Measurement Report field 1940 for WUR Counters Group. Using the Statistics request/report, the existing 802.11 statistic collection method can be re-used for WUR events.

In accordance with a present embodiment, instead of reporting events, the WUR STAs nay also interpret the events and directly send "requests" to the AP, like illustrated in FIGS. 20A, 20B, 20C, and 20D. FIG. 20A shows a table 2000 indicating events and the corresponding requests. FIG. 20B shows the WUR Parameters field 2020 in the WUR Mode element from WUR non-AP STAs, including a WUR Requests subfield 2030. FIG. 20C illustrates the WUR Requests subfield 2030. The WUR STA may set the "Wake-up Protection" bit 2032 to 1 if to request the WUR AP to enable protection of WUR wake-up frame addressed to it. The WUR STA may set "Beacon Protection" bit 2034 to 1 to request the WUR AP to enable protection of group addressed WUR frame. Alternatively, a single bit may be used to request protection: "Protection" and is set to 1 to request the WUR AP to enable protection of all applicable WUR frames. Requests to enable protection may also trigger the 4-way handshake/Group Key handshake to obtain the respective integrity Keys. The WUR STA may also request to terminate existing Protected WUR Service without deleting the WUR integrity Keys by setting the Protection bit to 0 (Upon determining that the "Attack" has subsided). Alternatively, either the WUR STA or the WUR AP may tear down the WUR Mode and re-negotiate unprotected WUR mode. This however may also delete the WUR integrity Keys. The WUR STAs may include the "WUR Requests" bitmap in the WUR Parameters field in Enter WUR Mode (Suspend) Requests frames. FIG. 20D shows WUR parameters field 204 from the WUR AP (in WUR Mode element) including a Protection field 2050. FIG. 20E shows the Protection field 2050. The WUR AP may set the "Wake-up Protection enabled" bit 2052 to 1 if it intends to transmit protect Wake-up frames to a WUR STA. The WUR STA may set the "Beacon Protection enabled" bit 2052 to 1 if the WUR Beacons are protected. Alternatively, a single bit may be used to indicate that all WUR frames in the BSS are protected ("Protection enabled" and is set to 1).

FIG. 21A shows a WUR operation element 2100, including a WUR parameters sub-field 2110 and a WUR threshold sub-field 2120. FIG. 21B shows the WUR parameters sub-field 2110. The WUR AP may set the "Protection Required" bit 2112 to 1 to advertise that the WUR AP uses protected WUR frames during WUR services. WUR Mode requests from WUR STAs which do not support WUR Protection may be denied (The WUR Mode Response Status field in the Enter WUR Mode response sent in response to the WUR STA's Enter WUR Mode request may be set to a value indicating "Denied-Protection Required"). The "Protection Required" bit 2112 may be set to 1 right from the BSS setup as a system requirement in some use cases e.g. in high security industrial sensors; while for other low risk use cases, initially the bit may be set to 0 and when an "Attack" is reported or Protection is requested by WUR STAs, WUR AP may initiate protection procedures (integrity key distribution etc.) and set the bit to 1. If the "Protection Required" bit 2112 is set to 1, unprotected broadcast Wake-up frames are not transmitted by the WUR AP and WUR STAs in unprotected WUR Mode should not wake-up upon reception of unprotected broadcast Wake-up frames. WUR AP only transmits unprotected unicast wake-up frames for WUR STAs incapable of protected WUR service that are already associated with WUR AP prior to the AP setting the "Protection Required" bit 2112 to 1. Alternatively, the WUR AP may assign a special group ID (e.g. Protected GID) to each WUR STA that has negotiated protected WUR service with the AP. Instead of a broadcast wake-up frame, WUR AP transmits a protected group-addressed wake-up frame addressed to the "protected GID". The "protected GID" may be pre-defined in the 11ba specification, or it may be dynamically assigned and advertised by the WUR AP, e.g. in the WUR Operation element. The AP may control the frequency of WUR parameter change requests initiated by WUR STAs by including the WUR Thresholds sub-field 2120 in the WUR Operation element 2100. FIG. 21C shows the WUR Threshold sub-field 2120. With the processing described above, AP operation may be simple, but the AP may be able to control the frequency of WUR parameter change requests initiated by WUR STAB.

Figure 22:
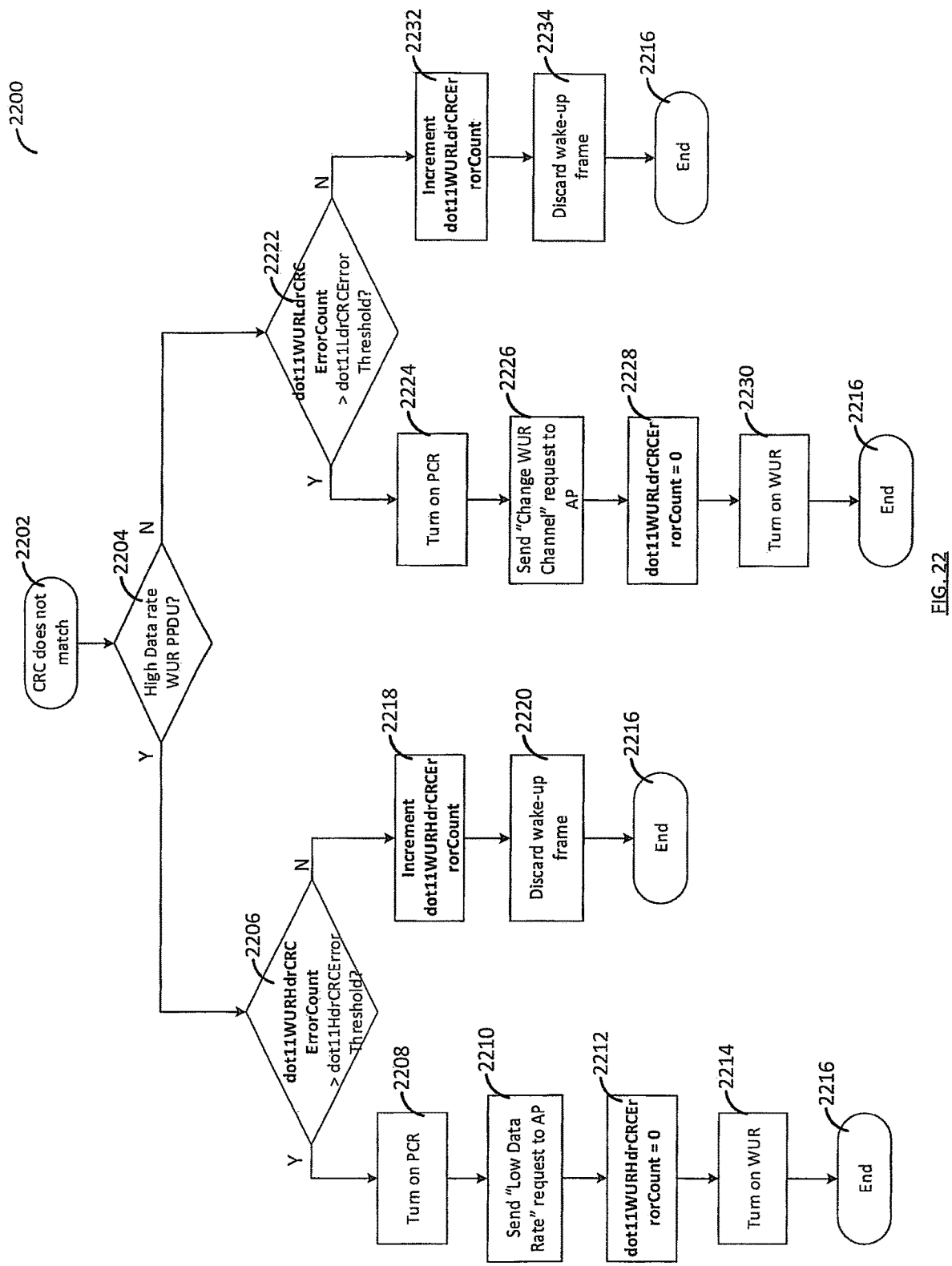
FIG. 22 shows a flow diagram illustrating a detailed WUR STA's Receiver processing flow to detect CRC Error.

FIG. 22 shows a flow diagram 2200 illustrating a detailed WUR STA's Receiver processing flow to detect CRC Error, which may be done separately for Low Data Rate and High Data Rate (which is expanded from the relevant section of FIG. 12). An HDR CRC Error beyond a specified threshold can trigger the WUR STA to request WUR AP to use Low Data Rate. Similarly an LDR CRC Error beyond a specified threshold can indicate interference on the WUR channel and trigger the WUR STA to request change of WUR channel. At step 2202, it is determined that CRC does not match. It is assumed that the address is correct and matches. It is to be noted that small probabilities exist that CRC error was caused due to OBSS frame with matching address (wrong Embedded BSSID will lead to CRC error) but this may be ignored as the probabilities are small. At step 2204, it is determined whether a high data rate is used for the data portion of the WUR PPDU. If it is determined that a high data rate is used, processing may continue at step 2206; otherwise, processing may continue at step 2222. At step 2206, it is determined whether dot11WURHdrCRCErrorCount is larger than dot11HdrCRCErrorThreshold. If it is determined that dot11WURHdrCRCErrorCount is larger than dotHdrCRCErrorThreshold, processing may continue at step 2208; otherwise, processing may continue at step 2218. At step 2208, PCR may be turned on. At step 2210, the STA may send a "Low Data Rate" request to the AP. At step 2212, dot11WURHdrCRCErrorCount may be set to 0. At step 2214, WUR may be turned on, and processing may end (step 2216). At step 2218, dot11WURHdrCRCErrorCount may be incremented. At step 2220, the wake-up frame may be discarded, and processing may end (step 2216). At step 2222, it is determined whether dot11WURLdrCRCErrorCount is larger than dot11LdrCRCErrorThreshold. If it is determined that dot11WURLdrCRCErrorCount is larger than dot11LdrCRCErrorThreshold, processing may continue at step 2224; otherwise, processing may continue at step 2232. At step 2224, PCR may be turned on. At step 2226, the STA may send a "Change WUR Channel" request to the AP. At step 2228, dot11WURLdrCRCErrorCount may be set to 0. At step 2230, WUR may be turned on, and processing may end (step 2216). At step 2232, dot11WURLdrCRCErrorCount may be incremented. At step 2234, the wake-up frame may be discarded, and processing may end (step 2216).

Figure 23A:
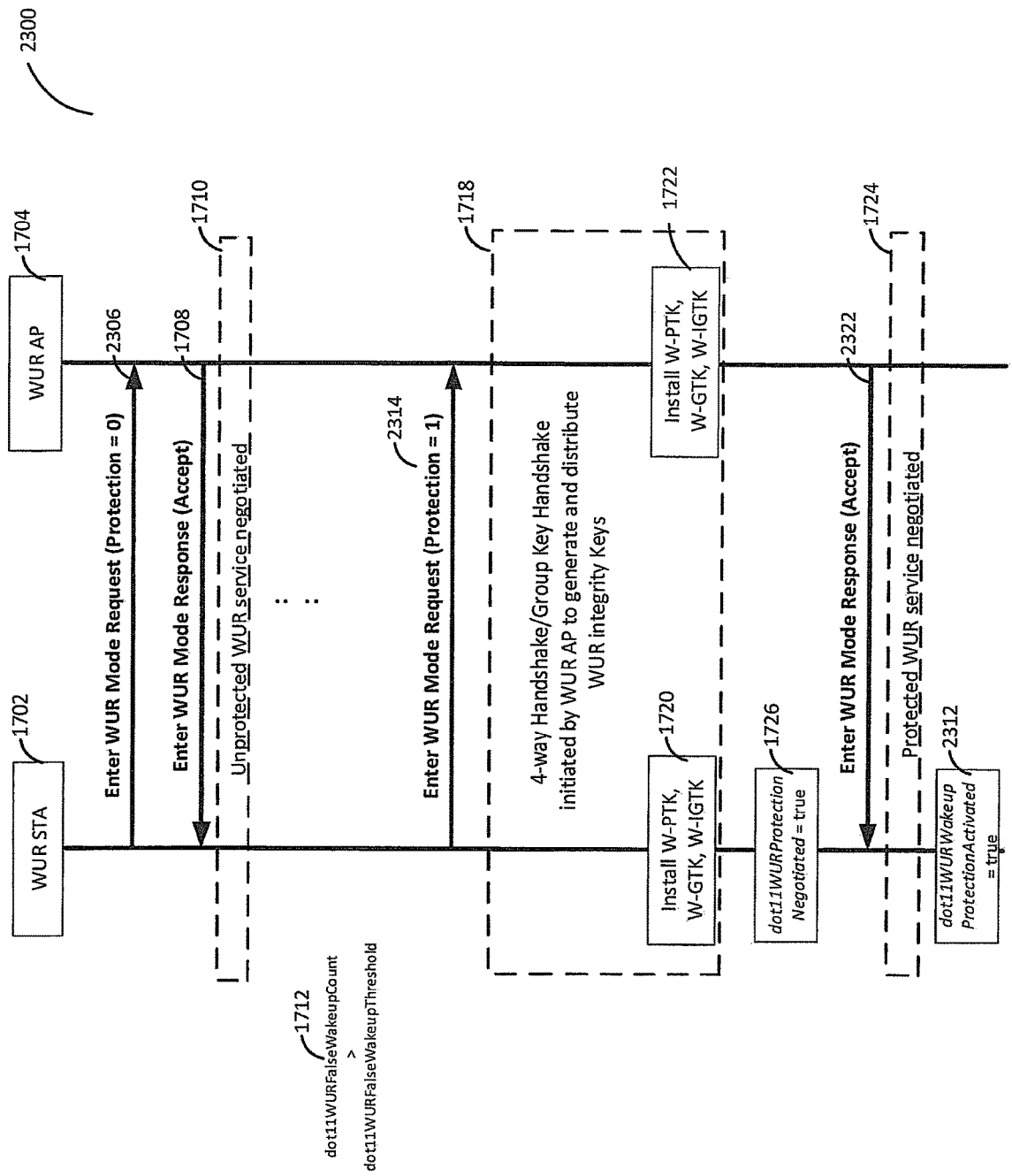
FIG. 23A shows a flow diagram illustrating an example message sequence showing WUR STA initiated setup of Protected WUR service when the false wakeup count crosses a threshold.

FIG. 23A shows a flow diagram 2300 illustrating an example message sequence showing WUR STA initiated setup of Protected WUR service when the false wakeup count crosses a threshold. Various portions of FIG. 23A are identical or similar to portions of the flow diagram 1700 of FIG. 17, so that the same reference signs may be used and duplicate description may be omitted. The Enter WUR Mode Request message 2306 includes the Protection bit set to 0. The Enter WUR Mode (Suspend) Request message 2314 includes the WUR Parameters field with the Protection bit set to 1. Alternatively, if two bits are maintained, either or both the Wake-up Protection bit 2032 and/or Beacon Protection bit 2034 is set to 1 in the WUR Request field of the WUR Parameters field in Enter WUR Mode (Suspend) request frames. This causes the WUR AP 1704 to trigger the 4-way handshake and/or the Group Key handshake 1718 to distribute the integrity Keys used to protect WUR frames. In case the WUR integrity Keys have already been negotiated at the time the WUR STA associated with the WUR AP, step 1718 may be skipped. Finally, at step 2312, dot11WURWakeupProtectionActivated is set to TRUE.

Figure 23B:
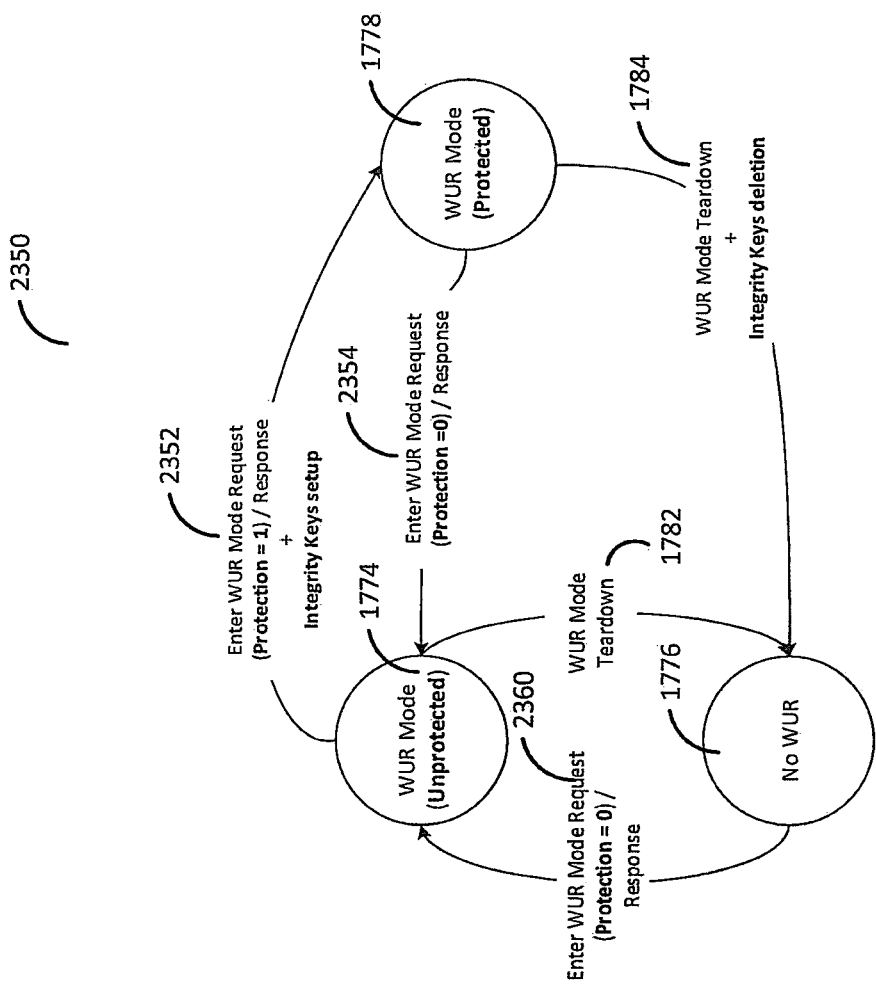
FIG. 23B shows an illustration of a state machine corresponding to the flow diagram of FIG. 23A.

FIG. 23B shows an illustration 2350 of a state machine corresponding to the flow diagram 2300 of FIG. 23A. Various states and transitions are identical or similar to states and transitions of the illustration 1770 of FIG. 17B, so that the same reference signs may be used and duplicate description may be omitted. Transitions "Enter WUR Mode Request (Protection=0)/Response" 2360 and transition "Enter WUR Mode Request (Protection=1)/Response and Integrity Keys setup" 2352 are where the illustration 2350 of FIG. 23B is different from the illustration 1770 of FIG. 17B. Here, instead of transmitting an Event Report Action frame to the WUR AP upon detection of the false wakeup event, the WUR STA directly sends an Enter WUR Mode request to the AP with the Protection bit set to 1 to request the WUR AP to enable protection for applicable WUR frames addressed to the WUR STA. When in the Protected WUR Mode, (Upon determining that the "Attack" has subsided), WUR STA may also request the WUR AP to terminate the Protected WUR Service by setting the Protection bit to 0 in the Enter WUR Mode Requests 2354. If the request is accepted by the WUR AP, the WUR STA may move back to the unprotected WUR mode without deleting the WUR integrity Keys. When the WUR STA transitions to the protected WUR mode in the future, it can skip the WUR integrity Key negotiation.

Figure 23C:
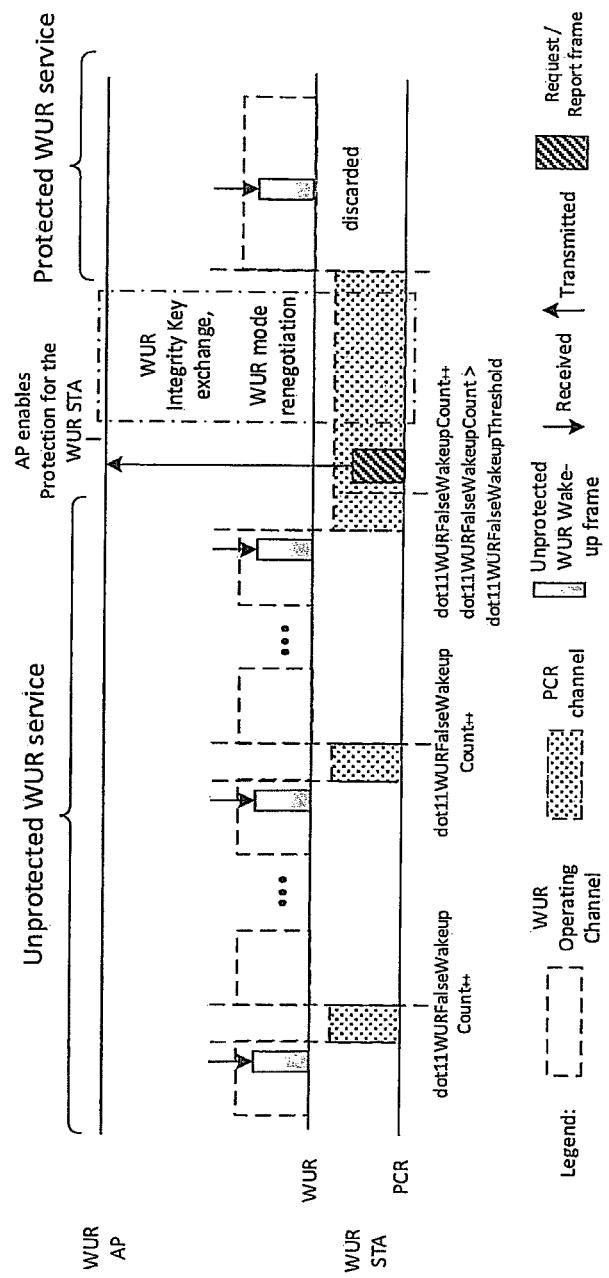
FIG. 23C shows a pictorial view of the flow illustrated in FIG. 23A.

FIG. 23C shows a pictorial view 2370 of the flow illustrated in FIG. 23A.

Figure 24A:
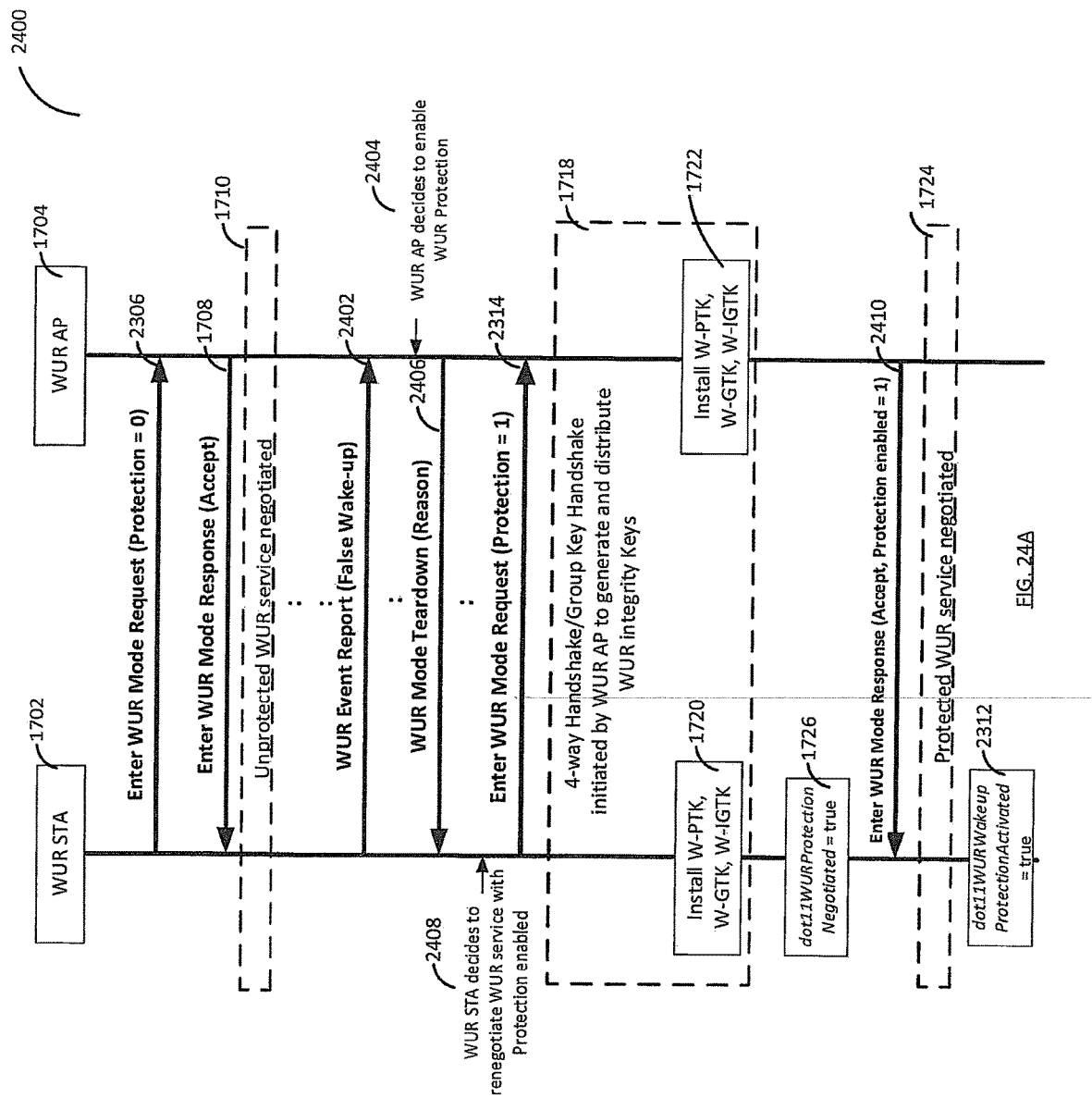
FIG. 24A shows a flow diagram illustrating an example message sequence showing WUR AP initiated setup of Protected WUR service upon receipt of False Wakeup Event Report from WUR STAs.

FIG. 24A shows a flow diagram 2400 illustrating an example message sequence showing WUR AP initiated setup of Protected WUR service upon receipt of False Wakeup Event Report from WUR STAB. Various portions of FIG. 24A are identical or similar to portions of the flow diagram 1700 of FIG. 17 and/or the flow diagram 2300 of FIG. 23, so that the same reference signs may be used and duplicate description may be omitted. The WUR STA 1702 may send a WUR Event Report (indicating False Wake-up) 2402 to the WUR AP 1704. The WUR AP 1704 may decide to enable WUR protection at step 2404, and may transmit a WUR Mode Teardown message 2406, including a "Reason" field set to a value of "Protection Required", to the WUR STA 1702 to indicate that the WUR AP has enabled protection of WUR frames and the WUR STA should renegotiate protected WUR service with the WUR AP. At step 2408, the WUR STA 1702 may decide to renegotiate WUR service with protection enabled (i.e. with Protection bit set to 1) in the Enter WUR Mode Request message 2314. The WUR AP 1704 may initiate the WUR integrity Keys negotiation step 1718, completing which it sends an Enter WUR Mode Response 2410 (including Accept and Protection enabled bit set to 1) to the WUR STA 1702. Optionally, the WUR AP 1704 may also skip step 2406 (transmission of WUR Mode Teardown message) and directly initiate the WUR integrity Keys negotiation step 1718. Here step 1726 takes place right after completion of step 1718. In case the WUR integrity Keys have already been negotiated at the time the WUR STA associated with the WUR AP, step 1718 and step 1726 may be skipped. Finally, the WUR AP may transmit the Enter WUR Mode Response frame 2410 (unsolicited) with the Protection Enabled bit/s in the WUR Parameters field set to 1 (like described with reference to FIG. 21B above) to inform the WUR STA that protected WUR service has been enabled. In the second case, the WUR STA directly moves from the unprotected WUR Mode to protected WUR Mode upon receipt of the Enter WUR Mode Response frame 2410 (unsolicited). Upon determining that the "Attack" has subsided, WUR STA may also request the WUR AP to terminate the Protected WUR Service by setting the Protection bit to 0 in the Enter WUR Mode Requests. If the request is accepted by the WUR AP, the WUR STA may move back to the unprotected WUR mode without deleting the WUR integrity Keys. When the WUR STA transitions to the protected WUR mode in the future, it can skip the WUR integrity Key negotiation.

FIG. 24B shows the WUR Mode Teardown frame Action field format 2430. The new "Reason" field 2432 is added in WUR Mode Teardown Action frames to indicate the reason why the teardown was initiated. For example, a Reason value of "Protection Required" indicates to the WUR STA that it needs to renegotiate Protected WUR Mode with the AP. (i.e. with the Protection bit set to 1 in Enter WUR Mode request).

Figure 24C:
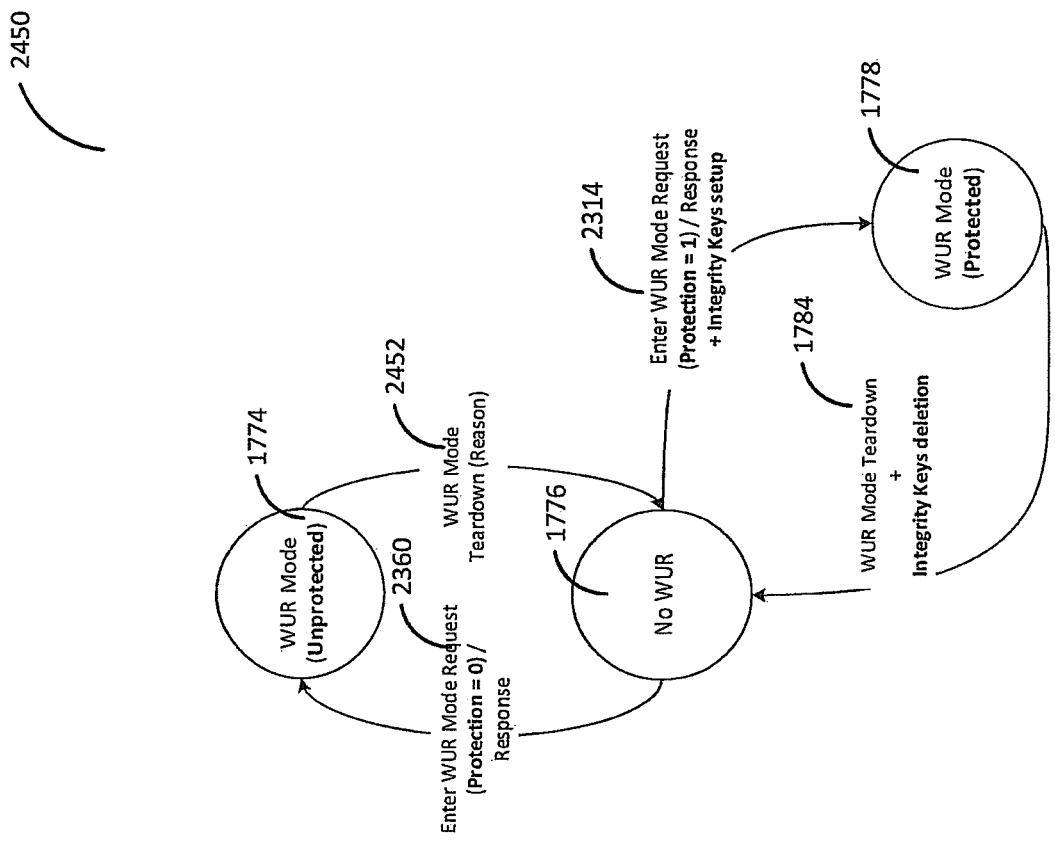
FIG. 24C shows an illustration of a state machine corresponding to the flow diagram of FIG. 24A.

FIG. 24C shows an illustration 2450 of a state machine corresponding to the flow diagram 2400 of FIG. 24A. Various states and transitions are identical or similar to states and transitions of the illustration 1770 of FIG. 17B and/or FIG. 23B, so that the same reference signs may be used and duplicate description may be omitted. In this case, it is not possible for WUR STA to directly transition for unprotected WUR mode to protected WUR mode. WUR STA needs to first return to the No WUR mode 1776 following the transition 2452 of "WUR Mode Teardown (Reason)" that may include the Reason field 2432. The WUR STA may send the Enter WUR Mode (Suspend) Request message 2314 that includes the WUR Parameters field with the Protection bit set to 1 to request the WUR AP to enable protected WUR service for the WUR STA.

Figure 25:
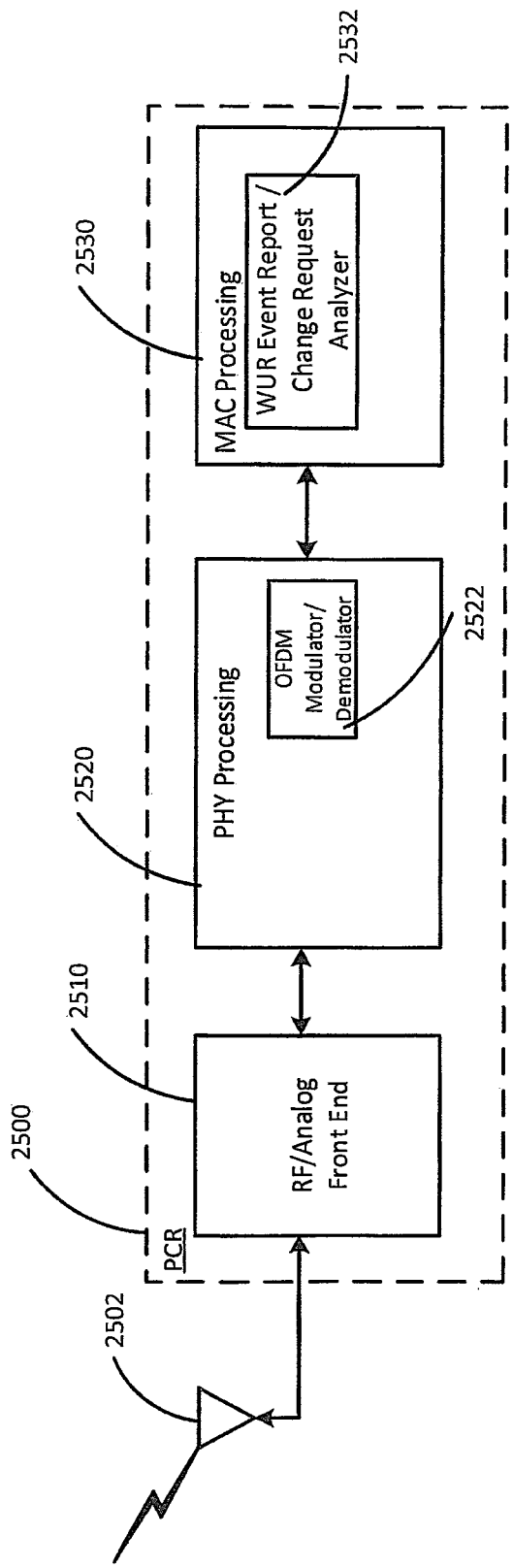
FIG. 25 is a simplified block diagram of the PCR of an example AP that implements the WUR Event Report and Change Request analyzing.

FIG. 25 is a block diagram of the PCR 2500 of an example AP that implements the WUR Event Report and Change Request analyzing described in the present disclosure. The AP may be the AP 110 in FIG. 1 (The PCR 2500 may be the PCR 112 in FIG. 1). The PCR 2500 is connected to the antenna 2502, and is used for the transmission and reception of 802.11 signals as well as for the transmission of WUR PPDUs. PCR 2500 is comprised of an RF/Analog front end 2510, PHY processing circuitry 2520 and MAC processing circuitry 2530, which may include an WUR Event Report/Change Request Analyzer 2532 that implements the WUR Event Report and Change Request analyzing described in the present disclosure. The WUR Event Report/Change Request Analyzer 2532 (which may be a part of a determination circuitry) determines based on information received from a radio station (STA) whether to change a setting related to transmission of WUR PPDU to the radio station. In accordance with a present embodiment, the WUR Event Report/Change Request Analyzer 2532 may determine the setting to be changed based on the information.

The RF/Analog front end 2510, which may comprise a receiver (referred to as a PCR receiver) and a transmitter (referred to as a PCR transmitter), is responsible for transfer of analog signals to/from the antenna 2502 and may comprise sub-components such as Automatic Gain Control (AGC), Low Pass Filter (LPF), Analog-to-Digital Converter (ADC) and so on.

The PHY Processing circuitry 2520 is responsible for the processing of the PHY layer signals and is further comprised of an OFDM modulator/demodulator 2522. The OFDM modulator/demodulator 2522 is responsible for the OFDM modulation of transmit signals or demodulation of received OFDM signals. On the transmission side, aside from applying OFDM modulation to 802.11 PPDUs, the OFDM modulator/demodulator 2522 is also used to generate WUR signal (e.g. OOK) by populating selected OFDM subcarriers.

The MAC Processing circuitry 2530 is responsible for various MAC related processing such as retransmission, fragmentation, aggregation etcetera.

Figure 26:
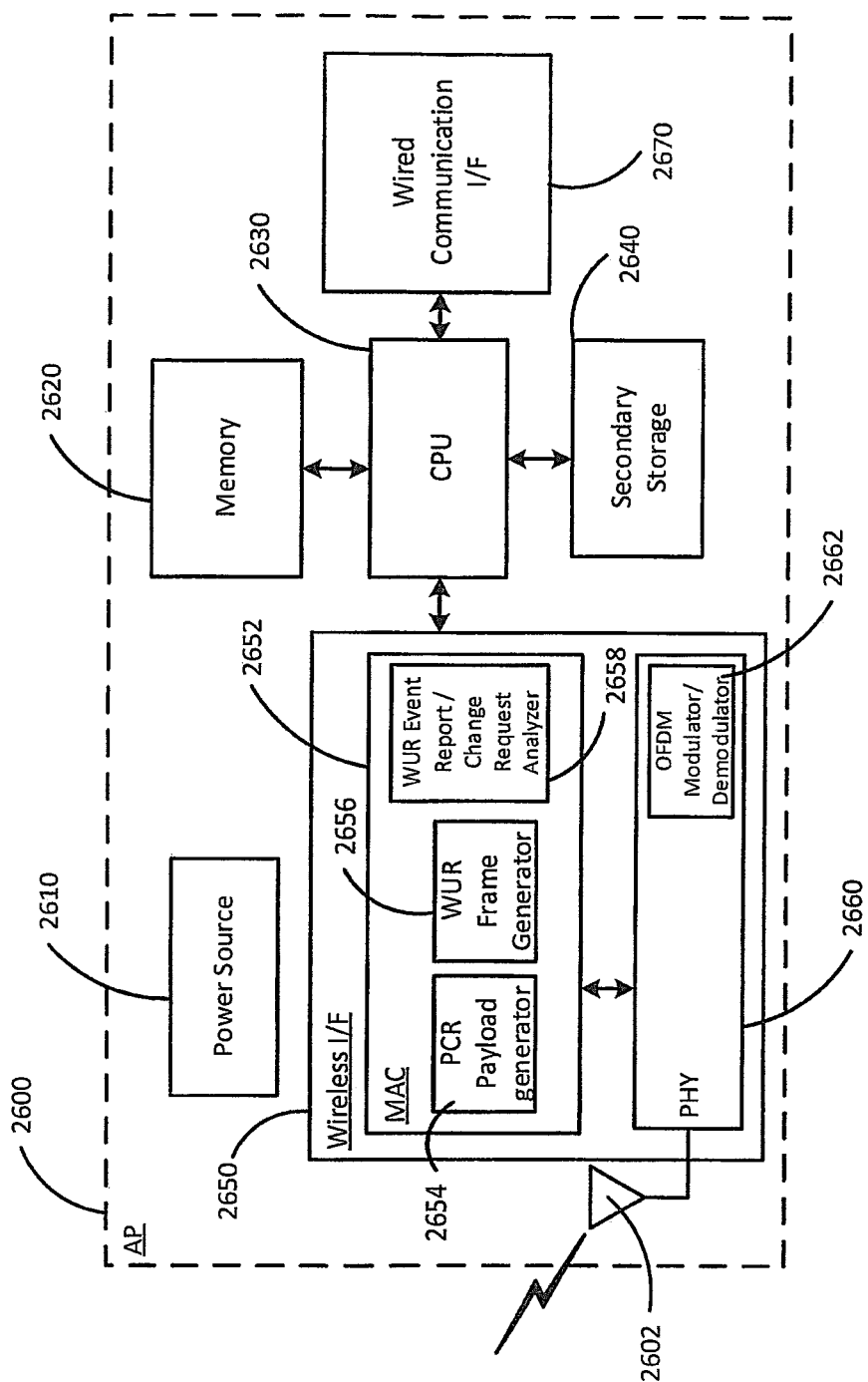
FIG. 26 is a more detailed block diagram of an example AP.

FIG. 26 is a more detailed block diagram of an example AP 2600, which may be the AP 110 in FIG. 1. The AP 2600 comprises a Central Processing Unit (CPU) 2630 coupled to a memory 2620, a secondary storage 2640, one or more wireless communication interfaces 2650, as well as other wired communication interfaces 2670. The secondary storage 2640 may be a non-volatile computer readable storage medium that is used to permanently store pertinent instruction codes, data etc.

At the time of start up, the CPU 2630 may copy the instruction codes as well as related data to the volatile memory 2620 for execution. The instruction code may be an operating system, user applications, device drivers, execution codes etc. which are required for the operation of the AP 2600. The size of the instruction code and hence the storage capacity of both the secondary storage 2640 as well as the memory 2620 may be substantially bigger than that of the STA 2800 in FIG. 28.

The AP 2600 may also comprise a power source 2610 which in most cases may be a power mains but in some cases may also be some kind of high capacity battery for e.g. a car battery. The wired communication interface 2670 may be an Ethernet interface, or a powerline interface, or a telephone line interface etc.

The wireless communication interface 2650 may comprise an interface for cellular communication, or an interface for short range communication protocols such as Zigbee, or it may be a WLAN interface. The wireless communication interface 2650 may further comprise a MAC module 2652 and a PHY module 2660. The MAC module 2652 of an AP may be substantially more complicated than that of a STA 2800 in FIG. 28 and may comprise many sub-modules. Among other sub-modules, the MAC module 2652 may be comprised of a WUR Frame Generator 2656, a PCR payload generator 2654 and a WUR Event Report/Change Request Analyzer 2658. The PHY module 2660 is responsible for the conversion of the MAC module data to/from the transmission/reception signals and is further comprised of an OFDM modulator/demodulator 2662. The wireless interface may also be coupled, via the PHY module, to one or more antennas 2602 that are responsible for the actual transmission/reception of the wireless communication signals on/from the wireless medium.

An AP as per the present disclosure may comprise many other components that are not illustrated, for sake of clarity, in FIG. 25 and FIG. 26. Only those components that are most pertinent to the present disclosure are illustrated.

Figure 27:
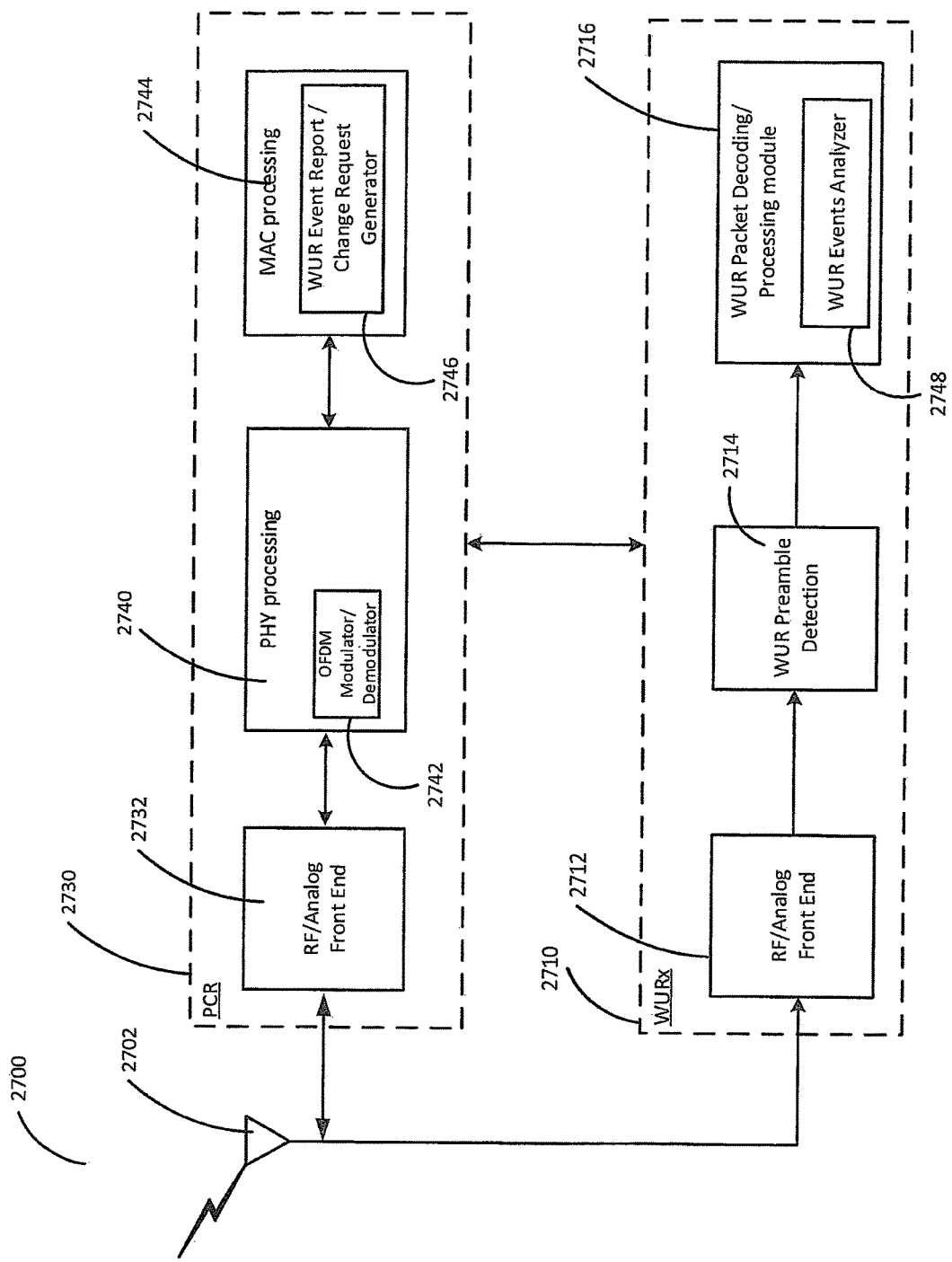
FIG. 27 is a simplified block diagram of an example STA that implements the WUR Event Reporting and Change Requesting.

FIG. 27 illustrates a WUR STA 2700 that is equipped with two separate radios: a PCR 2730 for transmitting and receiving 802.11 OFDM signals and a WUR 2710 for receiving WUR PPDUs.

The WURx 2710 is further comprised of several sub components such as an RF/Analog Front End 2712 responsible for receiving the analog radio signals from the antenna 2702, a WUR Preamble Detection module 2714 responsible for detecting and decoding the preamble portion of the WUR PPDUs, and a WUR Packet Decoding/Processing module 2716 responsible for decoding and processing the payload portion of the wakeup signal, which may include an WUR Events Analyzer 2748. The WUR Events Analyzer 2748 (which may also be a part of a determination circuitry) determines an unexpected event related to the reception of the WUR PPDU. The unexpected event may be due to at least one of a Cyclic Redundancy Check (CRC) error, an address collision, a replay attack, a large timing synchronization function (TSF) drift, a fake WUR beacon attack, a wrong transmit identifier (ID) in received WUR beacons, failure to receive WUR beacons at target wake up radio beacon transmission times (TWBTTs), an authentication error, or an integrity group temporal key (IGTK) packet number (IPN) out of sync. The WUR Events Analyzer 2748, in operation, may determine the unexpected event by determining occurrences of a corresponding incident. The predetermined incident may include at least one of WUR physical layer (PHY) protocol data units (PPDUs) received with failed cyclic redundancy check (CRC), wake-up frames that caused the radio station to falsely wake its primary connectivity radio (PCR), WUR beacons with PHY timing synchronization function (P-TSF) value outside expected range, missed WUR beacons, protected WUR frames with failed message integrity code (MIC), or protected WUR frames with IPN less than Replay Counter (RC). The Primary Connectivity Radio (PCR) 2730 (for example the PCR transmitter), in operation, may transmit the information if the number of occurrence of an event exceeds a corresponding threshold. The information may include information on the determined unexpected event. The Primary Connectivity Radio (PCR) 2730 (for example the PCR transmitter), in operation, may transmit the information in at least one of an IEEE 802.11 event report element, in an IEEE 802.11 measurement report element, in a WUR event element, or in a WUR mode element. The Primary Connectivity Radio (PCR) 2730 (for example the PCR transmitter), in operation, may transmit the information upon request from the access point. The Primary Connectivity Radio (PCR) 2730 (for example the PCR transmitter), in operation, may transmit the information independent from a request from the access point, for example periodically. The setting may be related to at least one of switching to low data rate for WUR transmissions to the radio station, assigning a different WUR Channel, enabling protection for WUR wake-up frames to the radio station, enabling protection for WUR beacons, or assigning a new integrity key to the radio station. Enabling protection may include a four way handshake protocol. The four way handshake protocol may include exchanging four Extensible Authentication Protocol over LANs (EAPOL) key messages between the radio station and the access point to generate and distribute pairwise integrity keys used for protection of WUR frames. Enabling protection may include a group key handshake protocol. The group key handshake protocol may include exchanging two Extensible Authentication Protocol over LANs (EAPOL) key messages between the radio station and the access point to generate and distribute group integrity keys used for protection of WUR frames.

The PCR 2730 is comprised of an RF/Analog front end 2732, PHY processing circuitry 2740, and a MAC processing circuitry 2744, which may include a WUR Event Report/Change Request Generator 2746. The WUR Event Report/Change Request Generator 2746 may be a part of the determination circuitry. The WUR Event Report/Change Request Generator 2746, in operation, may determine a request for the setting to be changed based on the determined unexpected event; and wherein the information may include or may be an indication of the determined request. The RF/Analog front end 2732, which may comprise a receiver (referred to as a PCR receiver) and a transmitter (referred to as a PCR transmitter), is responsible for transfer of analog signals to/from the antenna 2702 and may comprise subcomponents such as Automatic Gain Control (AGC), Low Pass Filter (LPF), Analog-to-Digital Converter (ADC) and so on. The PHY Processing circuitry 2740 is responsible for the processing of the PHY layer signals and is further comprised of an OFDM modulator/demodulator 2742 that is responsible for the modulation of transmit OFDM signals or demodulation of received OFDM signals.

Figure 28:
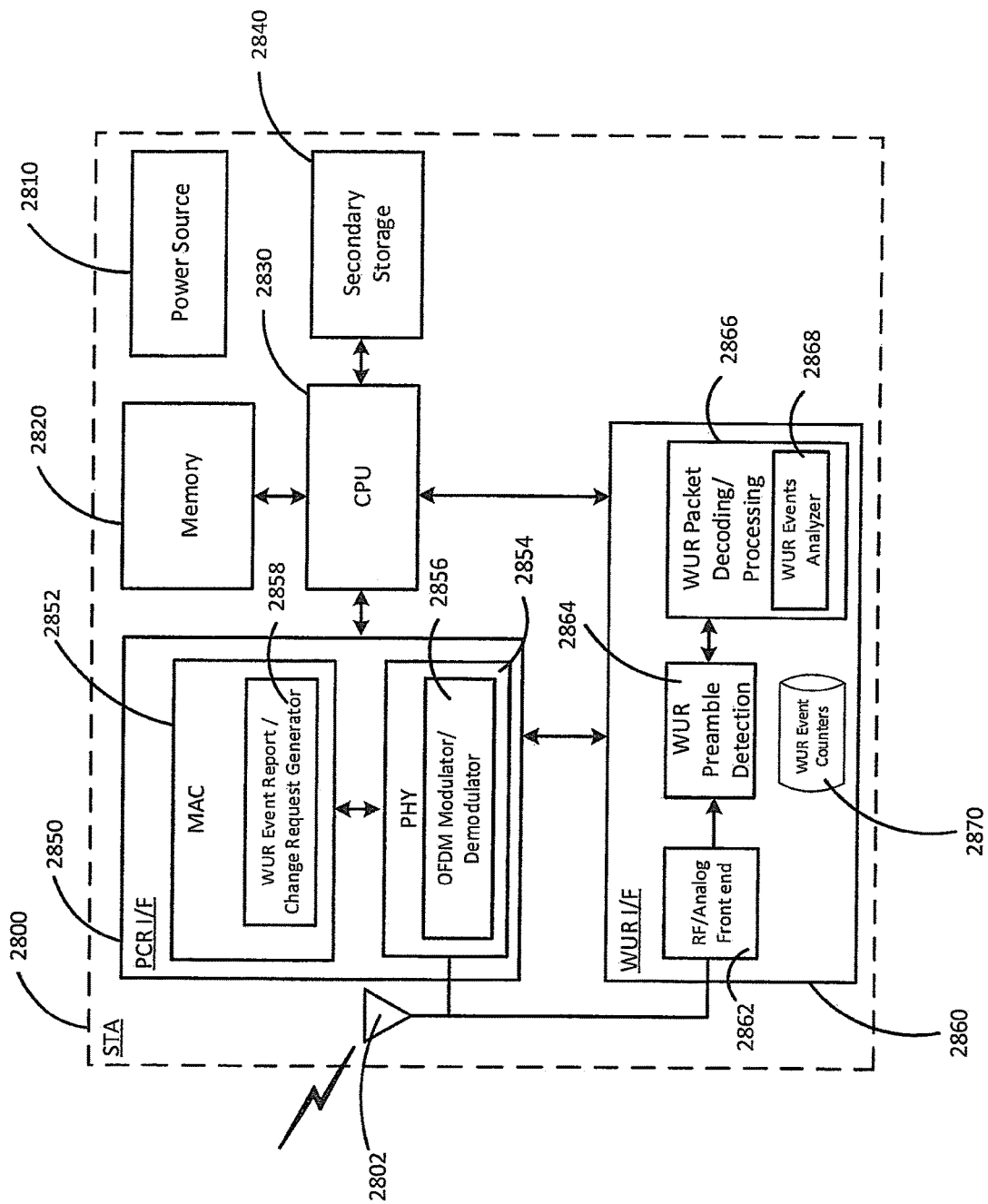
FIG. 28 is a detailed block diagram of an example STA that implements the WUR Event Reporting and Change Requesting.

FIG. 28 is a detailed block diagram of an example STA 2800 that implements the WUR Event Reporting and Change Requesting described in the present disclosure and may be STA 130 or STA 140 in FIG. 1. The STA 2800 is comprised of a Central Processing Unit (CPU) 2830 coupled to a memory 2820, a secondary storage 2840, one or more PCR interfaces 2850 as well a WUR interface 2860. Both the PCR interface 2850 and the WUR interface 2860 are connected to the same wireless antenna 2802. The secondary storage 2840 may be a non-volatile computer readable storage medium that is used to permanently store pertinent instruction codes, data etc.

At the time of start up, the CPU 2830 may copy the instruction codes as well as related data to the volatile memory 2820 for execution. The instruction code may be an operating system, user applications, device drivers, execution codes etc. which are required for the operation of the STA 2800. The STA 2800 may also comprise a power source 2810 for example a lithium ion battery or a coin cell battery etc. or it may also be mains electricity.

The PCR interface 2850 may comprise an interface for cellular communication, or an interface for short range communication protocols such as Zigbee, or it may be a WLAN interface.

The PCR interface 2850 is comprised of a MAC module 2852 (which may include a WUR Event Report/Change Request Generator 2858), and a PHY module 2854 which is further comprised of an OFDM Modulator/Demodulator 2856.

The WUR interface 2860 is comprised of several sub components such as an RF I Analog Front End 2862 responsible for receiving the analog radio signals from the antenna 2802, a WUR Preamble Detection module 2864 responsible for detecting and decoding the preamble portion of the wake up signal, a WUR Packet Decoding/Processing module 2866 (which may include a WUR Events Analyzer 2868) responsible for decoding and processing the payload portion of the wakeup signal, and a database storing WUR Events Counters 2870. The WUR Events Counters may be counters like described with reference to FIG. 5 above. For example, every time a pre-determined event is determined, the respective counter may be increased. Each counter may be reset after a pre-determined period of time, or after successfully transmitting a corresponding Event report/Change Request to the WUR AP.

A STA as per the present disclosure may comprise many other components that are not illustrated, for sake of clarity, in FIG. 27 or FIG. 28. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

INDUSTRIAL APPLICABILITY

This disclosure can for example be applied to a wireless apparatus to achieve a more robust WUR functionality.

The invention claimed is:

1. A communication apparatus comprising:
a transmitter, which, in operation, transmits a frame including a wake-up radio (WUR) mode element by using orthogonal frequency division multiplexing (OFDM) modulation, wherein the WUR mode element contains data rate information to be used for a WUR wake up frame that is transmitted by using on-off keying (OOK) modulation; and
a receiver, which, in operation, receives the WUR wake up frame.

2. The communication apparatus according to claim 1, wherein the receiver receives the WUR wake up frame when the communication apparatus is in WUR mode.

3. The communication apparatus according to claim 1, wherein the data rate information is set to indicate a high data rate (HDR) or a low data rate (LDR).

4. The communication apparatus according to claim 1, wherein the transmitter transmits the frame to negotiate a data rate for the OOK modulation with an access point that transmits the WUR wake up frame.

5. The communication apparatus according to claim 1, further comprising:
circuitry, which, in operation, determines an unexpected event, and
the transmitter, which, in operation, transmits information relating to the unexpected event.

6. The communication apparatus according to claim 5, wherein the unexpected event is due to at least one of a Cyclic Redundancy Check (CRC) error, an address collision, a replay attack, a large timing synchronization function (TSF) drift, a fake WUR beacon attack, a wrong transmit identifier (ID) in received WUR beacons, failure to receive WUR beacons at target wake up radio beacon transmission times (TWBTTs), an authentication error, or an integrity group temporal key (IGTK) packet number (IPN) out of sync.

7. The communication apparatus according to claim 6, wherein the circuitry determines the unexpected event by determining occurrences of an incident corresponding to the unexpected event.

8. The communication apparatus according to claim 7, wherein the determined incident comprises at least one of WUR physical layer (PHY) protocol data units (PPDUs) received with failed cyclic redundancy check (CRC), wake-up frames that caused the radio station to falsely wake its primary connectivity radio (PCR), WUR beacons with PHY timing synchronization function (P-TSF) value outside expected range, missed WUR beacons, protected WUR frames with failed message integrity code (MIC), or protected WUR frames with IPN less than Replay Counter (RC).

9. A communication method implemented by a communication apparatus, the communication method comprising:
transmitting a frame including a wake-up radio (WUR) mode element by using orthogonal frequency division multiplexing (OFDM) modulation, wherein the WUR mode element contains data rate information to be used for a WUR wake up frame that is transmitted by using on-off keying (OOK) modulation; and
receiving the WUR wake up frame.

10. The communication method according to claim 9, comprising receiving the WUR wake up frame when the communication apparatus is in WUR mode.

11. The communication method according to claim 9, wherein the data rate information is set to indicate a high data rate (HDR) or a low data rate (LDR).

12. The communication method according to claim 9, comprising transmitting the frame to negotiate a data rate for the OOK modulation with an access point that transmits the WUR wake up frame.

13. The communication method according to claim 9, further comprising:
   determining an unexpected event, and
   transmitting information relating to the unexpected event.

14. The communication method according to claim 13, wherein the unexpected event is due to at least one of a Cyclic Redundancy Check (CRC) error, an address collision, a replay attack, a large timing synchronization function (TSF) drift, a fake WUR beacon attack, a wrong transmit identifier (ID) in received WUR beacons, failure to receive WUR beacons at target wake up radio beacon transmission times (TWBTTs), an authentication error, or an integrity group temporal key (IGTK) packet number (IPN) out of sync.

15. The communication method according to claim 14, comprising determining the unexpected event by determining occurrences of an incident corresponding to the unexpected event.

16. The communication method according to claim 15, wherein the determined incident comprises at least one of WUR physical layer (PHY) protocol data units (PPDUs) received with failed cyclic redundancy check (CRC), wake-up frames that caused the radio station to falsely wake its primary connectivity radio (PCR), WUR beacons with PHY timing synchronization function (P-TSF) value outside expected range, missed WUR beacons, protected WUR frames with failed message integrity code (MIC), or protected WUR frames with IPN less than Replay Counter (RC).

\* \* \* \* \*